United States Patent [19]
Isono et al.

[11] Patent Number: 5,981,039
[45] Date of Patent: Nov. 9, 1999

[54] MAGNETIC RECORDING MEDIUM AND A MANUFACTURING METHOD THEREOF AS WELL AS A PHOTO-PRINTING APPARATUS USING SUCH A MAGNETIC RECORDING MEDIUM

[75] Inventors: Hitoshi Isono, Tenri; Kazuo Van, Nara, both of Japan

[73] Assignee: Sharp Kabushiki Kaisha, Osaka, Japan

[21] Appl. No.: 08/917,958

[22] Filed: Aug. 27, 1997

[30] Foreign Application Priority Data

Aug. 30, 1996 [JP] Japan ................................. 8-229585

[51] Int. Cl.⁶ ...................................................... G11B 5/66
[52] U.S. Cl. ...................... 428/199; 428/334; 428/694 T; 428/694 TS; 428/684 TM; 428/692; 428/900; 427/466; 427/510; 427/128; 427/129; 427/130; 427/131; 430/39
[58] Field of Search .................................. 428/692, 694 T, 428/694 TS, 694 TM, 199, 900, 334; 427/466, 510, 128–131; 430/39

[56] References Cited

U.S. PATENT DOCUMENTS 4,395,470  7/1983  Saitoh ........................................ 430/39

FOREIGN PATENT DOCUMENTS

| | | |
|---|---|---|
| 2 600 178 | 12/1987 | France . |
| 56-161572 | 11/1981 | Japan . |
| 56-161573 | 11/1981 | Japan . |
| 56-161572 | 12/1981 | Japan . |
| 56-161573 | 12/1981 | Japan . |
| 56-161574 | 12/1981 | Japan . |
| 57-136673 | 8/1982 | Japan . |
| 59-71076 | 4/1984 | Japan . |
| 61-20077 | 1/1986 | Japan . |
| 61-20078 | 1/1986 | Japan . |
| 62-100767 | 5/1987 | Japan . |
| 63-142361 | 6/1988 | Japan . |
| 64-46766 | 2/1989 | Japan . |

OTHER PUBLICATIONS

Yamagishi, et al. "An Analysis of Saw Toothed Transition of Magnetic Thin Film", Materials of Magnetic Recording Seminar, Electronic Information and Communication Society, MR 75–29, pp. 25–36 (partial trans), 1984.

S. Imamura, et al., "Recording and Developing Characteristics in Magnetography by Optical Writing", Journal of Electrophotography Society, vol. 24–4, pp. 21–20 (1985) (partial trans).

Primary Examiner—Leszek Kiliman
Attorney, Agent, or Firm—David G. Conlin; George W. Neuner

[57] ABSTRACT

A magnetic recording medium in accordance with the present invention is constituted by a first magnetic film having a magnetic anisotropy in a first direction parallel to the film surface and a second magnetic film that is formed on the first magnetic film and that is made of an amorphous alloy film of a rare-earth metal and a transition metal having a magnetic anisotropy in a second direction that is parallel to the film surface, and different from the first direction. In the above-mentioned magnetic recording medium, the first and second magnetic films have magnetic anisotropies having directions parallel to their surfaces and different from each other. When a magnetic latent image is formed on the magnetic recording medium of this type, it is possible to reduce the height of serration in the serrate magnetization transition structure appearing in the border of magnetization inversion in the magnetic latent image. Consequently, it becomes possible to improve the resolution of the magnetic-latent-image recording, and also to provide magnetic latent images with high resolution and high magnetic attracting force to magnetic toner.

24 Claims, 20 Drawing Sheets

(SAMPLE A)

(SAMPLE B)

(SAMPLE C)

BORDER OF MAGNETIZATION

MAGNETIC RECORDING MEDIUM AND A MANUFACTURING METHOD THEREOF AS WELL AS A PHOTO-PRINTING APPARATUS USING SUCH A MAGNETIC RECORDING MEDIUM

FIELD OF THE INVENTION

The present invention relates to a magnetic recording medium which is formed on a magnetic-latent-image bearing body on which a magnetic latent image is formed so that the magnetic latent image is developed by magnetic toner and the magnetic toner is copied onto a sheet of recording paper, and fixed thereon so as to obtain a hard copy; furthermore, this invention also concerns a manufacturing method thereof and a magnetic photo-printing apparatus using such a magnetic recording medium.

BACKGROUND OF THE INVENTION

A magnetic photo-printing method for obtaining a hard copy is generally referred to as magnetography. In the case of printers using the magnetography, a thermo-magnetic printer, which utilizes a thermo-magnetic recording method for heating a magnetic recording medium so as to reduce its coercive force and for forming a magnetic latent image by further applying a magnetic field, has been conventionally known.

Methods for forming magnetic latent images in this thermo-magnetic printer are classified into an in-plane recording method and a perpendicular recording method from the standpoint of directions of magnetization.

As illustrated in FIG. 29(a), the in-plane recording method refers to a method in which a magnetic latent image is formed with its magnetization direction parallel to the surface of the magnetic recording medium. Moreover, as illustrated in FIG. 29(b), the perpendicular recording method refers to a method in which a magnetic latent image is formed with its magnetization direction perpendicular to the surface of the magnetic recording medium.

With respect to the comparison between these two methods, Journal of Electrophotographic Society (page 14, vol. 24, No. 4, 1985) describes the priority of the in-plane magnetization method as follows:

In general, when recording is carried out on a magnetic recording medium, a reduction in the recording magnetic field is observed due to a diamagnetic field exerted on the recording region; however, in the case when the recording is made with a width of 10 to 200 $\mu$m on a recording film with a thickness (of 1 to 5 $\mu$m) that is normally formed, the in-plane recording method makes the diamagnetic field smaller as compared with the perpendicular recording method. Therefore, the in-plane recording method provides a greater recording magnetic field and is more advantageous in recording efficiency as compared with the perpendicular recording method.

Moreover, in a method wherein the magnetization of a magnetic recording medium is preliminarily aligned in one direction so as to be initialized and wherein a magnetic latent image is recorded by forming magnetized regions whose magnetization direction is reversed to the initialized direction, the in-plane recording method exerts a greater magnetic attracting force with respect to the magnetic toner as compared with the perpendicular recording method. For this reason, the in-plane magnetization method is more preferable than the perpendicular recording method in terms of the recording method for thermo-magnetic printers.

Here, with respect to the magnetic recording medium for use in the thermo-magnetic printers, the following characteristics are required:

① a greater magnetic attracting force (for high contrast),
② a high coercive force (for stability of recorded information),
③ a capability for recording a magnetic latent image with high resolution.

Further, for reduction in power consumption and high speeds of magnetic-latent-image recording, it is also required that there be a greater reduction in the coercive force upon receipt of a temperature rise.

Conventional magnetic recording media, used in magnetic printers of the in-plane recording method, have been disclosed in Japanese Laid-Open Patent Publication No. 161572/1981 (Tokukaishou 56-161572), Japanese Laid-Open Patent Publication No. 161573/1981 (Tokukaishou 56-161573), and Japanese Laid-Open Patent Publication No. 161574/1981 (Tokukaishou 56-161574). In each of the Patent Publications, a magnetic recording medium made of $CrO_2$ is formed on a sheet-like base layer. Further, Japanese Laid-Open Patent Publication No. 71076/1986 (Tokukaishou 59-71076) discloses a magnetic recording medium that is formed by applying $CrO_2$ onto a polyimide film together with a binder.

Moreover, Japanese Laid-Open Patent Publication No. 20077/1986 (Tokukaishou 61-20077) and Japanese Laid-Open Patent Publication No. 20078/1986 (Tokukaishou 61-20078) disclose a magnetic recording medium made of a material containing $Fe_nN$. This $Fe_nN$ is dispersed into a high-polymer-resin binding agent such as polyurethane and polyimide, and is applied to a base substrate made of polyethyleneterephthalate, polyimide, etc. having a thickness of 50 to 100 $\mu$m, so as to have a thickness of 5 to 30 $\mu$m.

However, toxicity of Cr, contained in the $CrO_2$, has been conventionally pointed out, and it is preferable to avoid the use of $CrO_2$ from the view of the current environmental issues. Further, in fact, the current situation makes it more difficult to obtain $CrO_2$.

Moreover, in the case of $Fe_nN$ materials, the $Fe_nN$, which contains iron as its ingredient, is susceptible to oxidation. Therefore, the problem with thermo-magnetic printers that are exposed to air at high temperatures is that the performance tends to deteriorate when they are used continuously for a long time.

Furthermore, each of $CrO_2$ and $Fe_nN$ is basically dispersed into a highpolymer resin resolved in a solvent, and applied onto a drum base, a film sheet, etc. so as to form a film; and this method has the following disadvantages: first of all, biased distribution of $CrO_2$ or $Fe_nN$ in the resin tends to cause unevenness in the characteristics of the magnetic recording medium, that is, it is difficult to control the dispersal state. Further, in the case of recording with a thermal head, a severe adhesion is required between the thermal head and the magnetic recording medium in order to maintain a uniform, sufficient thermal input to the magnetic recording medium. However, in the evaporating process of the above-mentioned solvent, irregularities in thickness tend to occur in the magnetic recording medium unless the evaporation rate is precisely controlled with respect to locations. In addition, in this process, it is difficult to control the film thickness of the medium in a uniform manner over a large area.

In order to solve the above-mentioned problems, the application of a sputtering method, an electron beam evaporation method, or other methods, in the film formation has been proposed. However, $CrO_2$ and $Fe_nN$ exhibit superior characteristics when they are used in a dispersed form in a highpolymer binder in a coated film. For this reason, in the case of the film formation using a sputtering method or an electron beam evaporation method, it is difficult to obtain the same level of characteristics as the coated film.

Moreover, with respect to materials for the magnetic recording medium, in addition to the materials described above, amorphous magnetic materials made of a rare-earth metal and a transition metal are also listed. Japanese Laid-Open Patent Publication No. 100767/1987 (Tokukaishou 62-100767), Japanese Laid-Open Patent Publication No. 142361/1988 (Tokukaishou 63-142361) and Japanese Laid-Open Patent Publication No. 46766/1989 (Tokukaishou 64-46766) disclose amorphous magnetic materials made of NdDyFeCo to which are added elements, such as Ti, Al, Cu and Cr. In addition, Japanese Laid-Open Patent Publication No. 136673/1982 (Tokukaishou 57-136673) discloses amorphous magnetic materials made of rare-earth metals and transition metals, such as GdCo, TbFe, GdFe, DyTb, (GdTb)Fe, (GdTb)Co, $TbFeO_3$, HoCo, DyFe and GdCoMo.

However, the above-mentioned amorphous magnetic materials are used for the perpendicular recording method, resulting in a problem in which they cannot be applied to the in-plane recording method as they are.

Even in the case of the above-mentioned amorphous magnetic materials, if the composition ratio of its rare-earth metal is made smaller, it is possible to manufacture an in-plane magnetization film that is applicable to the in-plane recording method; however, in order to obtain a sufficient attracting force to the magnetic toner by using the in-plane magnetization film that was manufactured by an amorphous magnetic material made of a rare-earth metal and a transition metal, it is necessary to make the thickness of the magnetic material greater.

In this case, if a thick in-plane magnetization film consisting of an amorphous magnetic material made of a rare-earth metal and a transition metal is manufactured by the sputtering method or the electron beam evaporation method, and applied to the magnetic recording medium of a magnetic printer, the height of serration in the serrate magnetization transition structure appearing in the border of magnetization inversion in a magnetic latent image formed on the magnetic recording medium tends to become greater. The resulting problem is that it is not possible to increase the resolution of the magnetic latent image recording (Electronic Information Communication Society, Papers of Magnetic Recording Seminar MR 75-29).

In order to enhance performances of magnetic photo-printing apparatuses, it is necessary to improve the characteristics ①②③ as described earlier. Therefore, the conventional problem is that it is not possible to obtain images with high resolution in the case when there is low resolution of a magnetic latent image such as that obtained by the magnetic recording medium that consists of an amorphous magnetic material and that is manufactured so as to have a greater film thickness.

SUMMARY OF THE INVENTION

The objective of the present invention is to provide a magnetic recording medium which exerts a sufficient magnetic attracting force to magnetic toner and ensures high resolution of a magnetic latent image formed thereon and a manufacturing method thereof, and also to provide a magnetic photo-printing apparatus which is capable of producing high-quality images by the use of the above-mentioned magnetic recording medium.

In order to achieve the above-mentioned objective, the magnetic recording medium of the present invention, whose magnetization direction is parallel to the surface thereof with its coercive force decreasing as temperature increases and on which, in a heated state, a magnetic latent image is formed by applying a bias magnetic field having a reverse direction to the magnetization direction in an initialized state, is provided with a laminated film consisting of a plurality of magnetic films, wherein the magnetic films have magnetic anisotropies having directions that are different from each other and that are parallel to the film surface and wherein the magnetic film that forms the upper-most film among the laminated films is an amorphous alloy film of a rare-earth metal and a transition metal.

In the above-mentioned arrangement of the magnetic recording medium, the magnetic film forming the upper-most film refers to a magnetic film that forms the surface of the laminated film. With the magnetic recording medium having this arrangement, since a plurality of magnetic films whose magnetic anisotropies have respectively different in-plane directions are stacked, even if the thickness of the magnetic film, which forms the upper-most film and which consists of an amorphous alloy film of a rare-earth metal and a transition metal, is made greater in order to obtain a sufficient attracting force to magnetic toner, it is possible to reduce the height of serration in the serrate magnetization transition structure appearing in the border of magnetization inversion of a magnetic latent image formed on the magnetic recording medium. Therefore, it becomes possible to increase the resolution of the magnetic latent image formed on the magnetic recording medium, and consequently to obtain images with high resolution.

Moreover, in the above-mentioned magnetic recording medium, the following arrangement may be adopted: the laminated film is constituted by the first magnetic film having a magnetic anisotropy in a first direction parallel to the film surface and the second magnetic film having a magnetic anisotropy in a second direction that is parallel to the film surface, and different from the first direction, the second magnetic film forming the upper-most film of the laminated film.

The above-mentioned first and second directions refer to directions of magnetic anisotropies in the first and second magnetic films, and the directions are parallel to the film surface, and different from each other. Therefore, in the above-mentioned magnetic recording medium, the first and second magnetic films have magnetic anisotropies that are parallel to the surfaces, and respectively different from each other. In the case when a magnetic latent image is formed on the second magnetic film forming the upper-most film of the magnetic recording medium of this type, since the two magnetic films whose magnetic anisotropies have respectively different in-plane directions are stacked, even if the second magnetic film is made of an amorphous alloy film of a rare-earth metal and a transition metal and then its film thickness is made greater, it is possible to reduce the height of serration in the serrate magnetization transition structure appearing in the border of magnetization inversion of a magnetic latent image formed on the magnetic recording medium. Therefore, it is possible to increase the resolution of the magnetic latent image recording, and also to form a magnetic latent image with high resolution having a great magnetic attracting force to magnetic toner.

Moreover, the manufacturing method of the magnetic recording medium of the present invention for manufacturing the magnetic recording medium, which is constituted by a first magnetic film having a magnetic anisotropy in a first direction parallel to the film surface and a second magnetic film that is formed on the first magnetic film and that is made of an amorphous alloy film of a rare-earth metal and a transition metal having a magnetic anisotropy in a second direction that is parallel to the film surface, but different from the first direction, whose magnetization direction is parallel to the surface thereof with its coercive force decreasing as temperature increases and on which, in a heated state, a magnetic latent image is formed by applying a bias magnetic field having a reverse direction to the magnetization direction in an initialized state, is provided with the steps of: forming the first magnetic film and forming the second magnetic film on the first magnetic film while applying a magnetic field in the second direction.

In the above-mentioned manufacturing method, the formation of the second magnetic film is carried out while applying a magnetic field in a desired direction parallel to the surface of this magnetic film. Therefore, the second magnetic film is allowed to have a magnetic anisotropy having a direction in which the external magnetic field is applied. Similarly, upon formation of the first magnetic film, the first magnetic film is allowed to have a magnetic anisotropy having a desired direction by applying a magnetic field in the desired direction parallel to the surface of the magnetic film. Thus, the directions of magnetic anisotropies of the first magnetic film and the second magnetic film are easily controlled. Moreover, the first magnetic film is allowed to acquire a magnetic anisotropy having a desired direction by carrying out a heat treatment while applying an external magnetic field in the first direction.

Therefore, it is possible to easily align the directions of magnetic anisotropies of the first and second magnetic films in directions different from each other. Consequently, it becomes possible to manufacture a magnetic recording medium which, upon forming a magnetic latent image, reduces the height of serration in the serrate magnetization transition structure appearing in the border of magnetization inversion of a magnetic latent image formed on the magnetic recording medium. Therefore, it is possible to manufacture a magnetic recording medium which increases the resolution of the magnetic latent image recording and forms a magnetic latent image with high resolution having a great magnetic attracting force to magnetic toner.

Furthermore, the magnetic photo-printing apparatus of the present invention is provided with: a magnetic latent image forming body having a base on which a magnetic recording medium which is constituted by a first magnetic film having a magnetic anisotropy in a first direction parallel to the film surface and a second magnetic film that is formed on the first magnetic film and that is made of an amorphous alloy film of a rare-earth metal and a transition metal having a magnetic anisotropy in a second direction that is parallel to the film surface, whose magnetization direction is parallel to the surface thereof with the coercive force of the second magnetic film decreasing as temperature increases and on which, in a heated state, a magnetic latent image is formed by applying a bias magnetic field having a reverse direction to the magnetization direction in an initialized state; an initializing-magnetic-field generation means for aligning the magnetization direction of the second magnetic film of the magnetic recording medium in one direction so as to form an initialized state; a bias-magnetic-field applying means for applying a bias magnetic field having a magnetization direction reverse to that of the initialized state to the second magnetic film upon recording the magnetic latent image; and a thermal input means for heating the second magnetic film to a predetermined temperature.

As described above, the magnetic recording medium in the above-mentioned magnetic photo-printing apparatus makes it possible to reduce the height of serration in the serrate magnetization transition structure appearing in the border of magnetization inversion of a magnetic latent image formed on the magnetic recording medium. Therefore, it is possible to form a magnetic latent image with high resolution, and also to attract magnetic tone stably. Consequently, the magnetic photo-printing apparatus makes it possible to obtain recorded images with high resolution and high contrast.

For a fuller understanding of the nature and advantages of the invention, reference should be made to the ensuing detailed description taken in conjunction with the accompanying drawings.

BRIEF DESCRIPTION OF THE DRAWINGS

FIG. 13 (b) is an explanatory drawing that schematically shows the magnetic latent image of FIG. 13(a).

DESCRIPTION OF THE EMBODIMENTS

EMBODIMENT 1

The following description will discuss the first embodiment of the present invention. In the present embodiment, the explanation will be given of a case in which a magnetic recording medium is applied to a thermo-magnetic printer that serves as a magnetic photo-printing apparatus.

Figure 2:
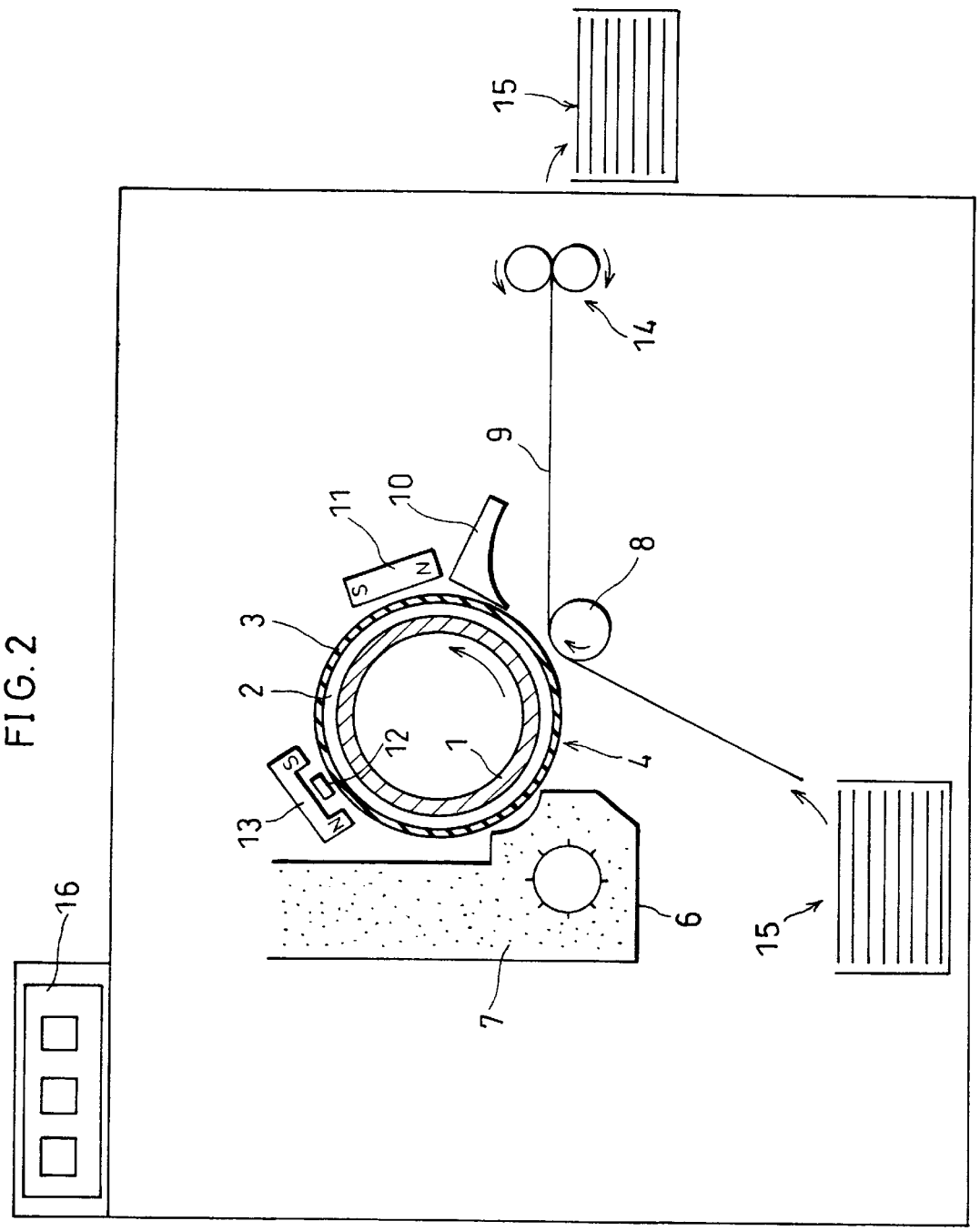
FIG. 2 is an explanatory drawing that shows a schematic construction of a thermo-magnetic printer in accordance with Embodiment 1 of the present invention.

FIG. 2 is an explanatory drawing that schematically shows a construction of the thermo-magnetic printer of the present embodiment (hereinafter, referred to as the present thermo-magnetic printer). As illustrated in this Figure, the present thermo-magnetic printer is constituted by a magnetic drum (a magnetic-latent-image-bearing body) 4, a developing device 6, a transfer roller 8, a conveyer belt 9, a cleaning device 10, a one-directional-magnetization magnet (an initializing-magnetic-field generation means) 11, a thermal-head device (a thermo-input means) 12, a bias-magnetic-field applying magnet (a bias-magnetic-field applying means) 13, a fixing device 14, sheets of recording paper 15, and a control panel 16 through which the user operates the present thermo-magnetic printer.

Figure 1:
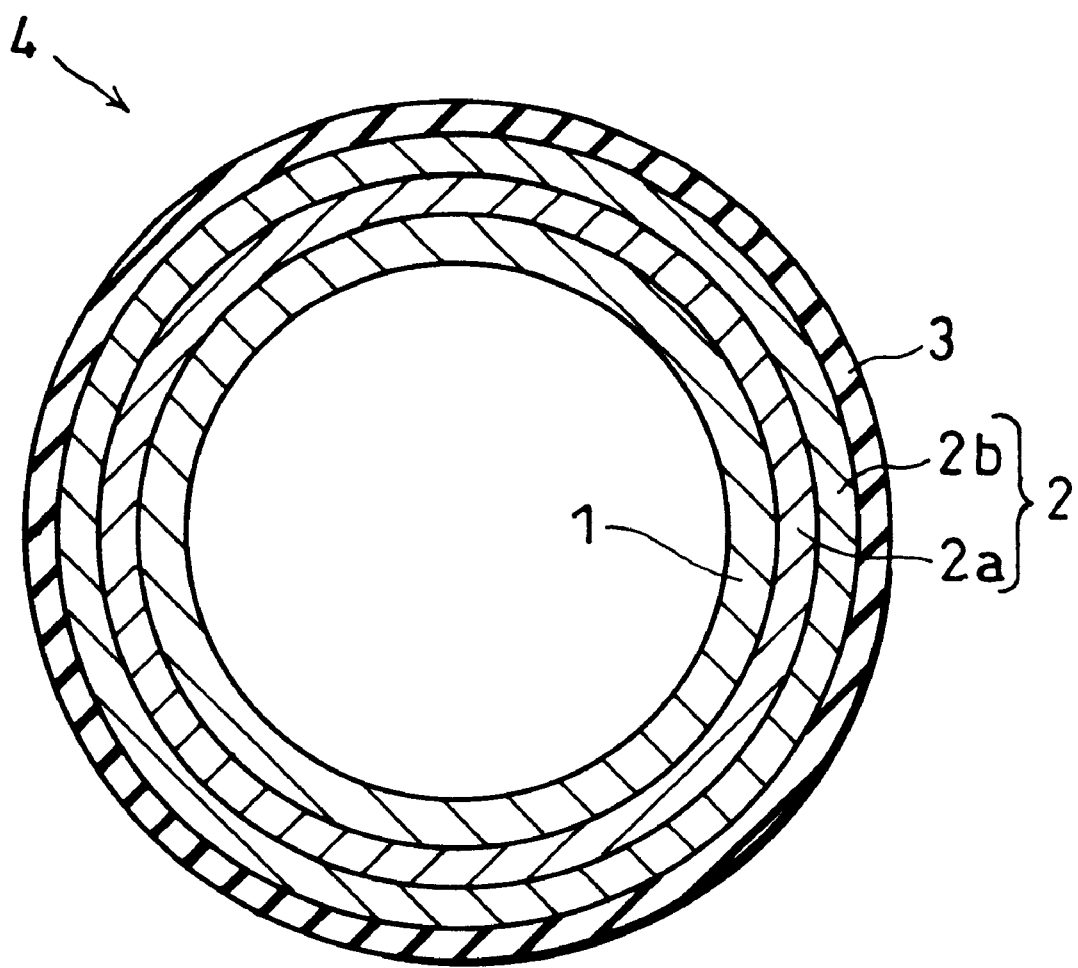
FIG. 1 is a cross-sectional view showing a construction of a magnetic drum in a thermo-magnetic printer in accordance with Embodiment 1 of the present invention.

FIG. 1 is a cross-sectional view that shows the construction of the magnetic drum 4 of FIG. 2 in an enlarged manner. As shown in this Figure, the magnetic drum 4 is constituted by a magnetic recording medium 2 having a characteristic such that its coercive force decreases as temperature rises and a protective film 3 that are formed on the surface of a drum base (base) 1.

The drum base 1 is made of, for example, Al as a material. The protective film 3 is made of a nitride such as AlN and TiN. This film is provided so as to improve weather resistance of the magnetic recording medium 2, and in the case when the thermal-head device 12 is used for recording, this film is also provided so as to improve abrasion resistance since the thermal-head device 12 comes into contact with the surface of the magnetic drum 4. The protective layer 3 is formed by a sputtering method or an electron beam evaporation method, and its film thickness is preferably set in the range of 0.01 to 1.0 μm. Additionally, in the case of the application of a non-contact thermo-input using a laser beam, etc., with respect to the material for the protective layer 3, since it is only necessary to take weather resistance into consideration, highpolymer materials may be adopted as the material.

The magnetic recording medium 2 is constituted by a first magnetic film 2a and a second magnetic film 2b. The second magnetic film 2b is a recording film for recording a magnetic latent image on the magnetic recording medium 2. With respect to the magnetic recording medium 2, a detailed explanation will be given later.

As illustrated in FIG. 2, on the periphery of the magnetic drum 4, the cleaning device 10, the one-directional magnetization magnet 11, the thermal-head device 12 and the bias-magnetic-field applying magnet 13 are placed.

The one-directional-magnetization magnet 11 is used for aligning the magnetization direction of the magnetic film 2b of the magnetic recording medium 2 in one direction for an initialization purpose. The thermal-head device 12 is used for applying a thermal input to the magnetic recording medium 2 so as to heat it to a predetermined temperature.

Further, the bias-magnetic-field applying magnet 13 applies an external magnetic field that is greater than the coercive force of the second magnetic film 2b of the magnetic recording medium 2 at the predetermined temperature to the magnetic recording medium 2 in a direction reversed to the initialization direction. The cleaning device 10 removes excessive magnetic toner 7 that remains on the surface of the magnetic drum 4 without being transferred to a sheet of recording paper 15.

With respect to the predetermined temperature, it is necessary to provide different values depending on magnetic characteristics of the second magnetic film 2b, such as the shape of a hysteresis loop. In other words, it is necessary to set it to such a temperature that the coercive force of the second magnetic film 2b of the magnetic recording medium 2 becomes smaller so that the magnetization of the second magnetic film 2b is inverted by the external magnetic field that is applied by the bias-magnetic-field applying magnet 13. In the case of temperature rises using the thermal-head device 12 or light irradiation, the maximum temperature limit is considered to be approximately 200° C. Therefore, the coercive force of the second magnetic film 2b is required to become smaller than an applicable bias magnetic field at least at 200° C.

The developing device 6, which contains magnetic toner 7 inside, is used for sending the toner 7 to the magnetic drum 4 on which a magnetic latent image has been formed. The transfer roller 8, which is placed face to face with the magnetic drum 4 with the conveyer belt 9 sandwiched in between, transfers the magnetic toner 7 onto the sheet of recording paper 15. The conveyer belt 9 conveys the sheet of recording paper 15 toward the transfer roller 8 and the fixing device 14. Further, the fixing device 14 fixes the magnetic toner 7 onto the sheet of recording paper 15.

The following description will discuss the operation of the present thermo-magnetic printer having the above-mentioned arrangement in accordance with a sequence of processes.

① In FIG. 2, the magnetic drum 4 rotates in a direction indicated by the arrow, and it is magnetized and initialized by the one-directional-magnetization magnet 11 so that the magnetization direction of the second magnetic film 2b in the magnetic recording medium 2 is saturated to one direction. Next, the thermal-head device 12 applies a thermal input to the magnetic recording medium 2 so that the magnetic recording medium 2 is heated to a predetermined temperature, and then the bias-magnetic-field applying magnet 13 applies a magnetic field whose direction is reversed to the initialization direction to the magnetic recording medium 2 in this state. This bias-magnetic-field applying operation can be made by controlling an electro magnet using a control device, not shown, in accordance with signals corresponding to an image to be formed, or can be made by applying a bias magnetic field using a permanent magnet. Thus, a magnetic latent image, whose magnetization direction is inverted, is formed on the magnetic recording medium 2.

② Next, the magnetic toner 7 is scattered onto the magnetic recording medium 2 bearing the magnetic latent image by the developing device 6. Consequently, the magnetic latent image is developed by the magnetic toner 7 so that it becomes a visual image. The toner image is transferred onto the sheet of recording paper 15 by the transfer roller 8.

③ Thereafter, the sheet of recording paper 15 is transported to the fixing device 14 by the conveyer belt 9, and the toner image is fixed onto the sheet of recording paper 15 by the fixing device 14. Further, magnetic toner 7 remaining on the surface of the magnetic drum 4 is removed therefrom by the cleaning device 10.

The above-mentioned processes ① through ③ correspond to an operation for obtaining one image. In the case when another image is successively obtained, the above-mentioned processes ① through ③ are repeated. Further, in the case of a multiple-copying operation wherein a plurality of copies of the same image are obtained, the processes ② and ③ are repeated without carrying out the initialization of the magnetic film 2b in the magnetic recording medium 2.

Figure 30:
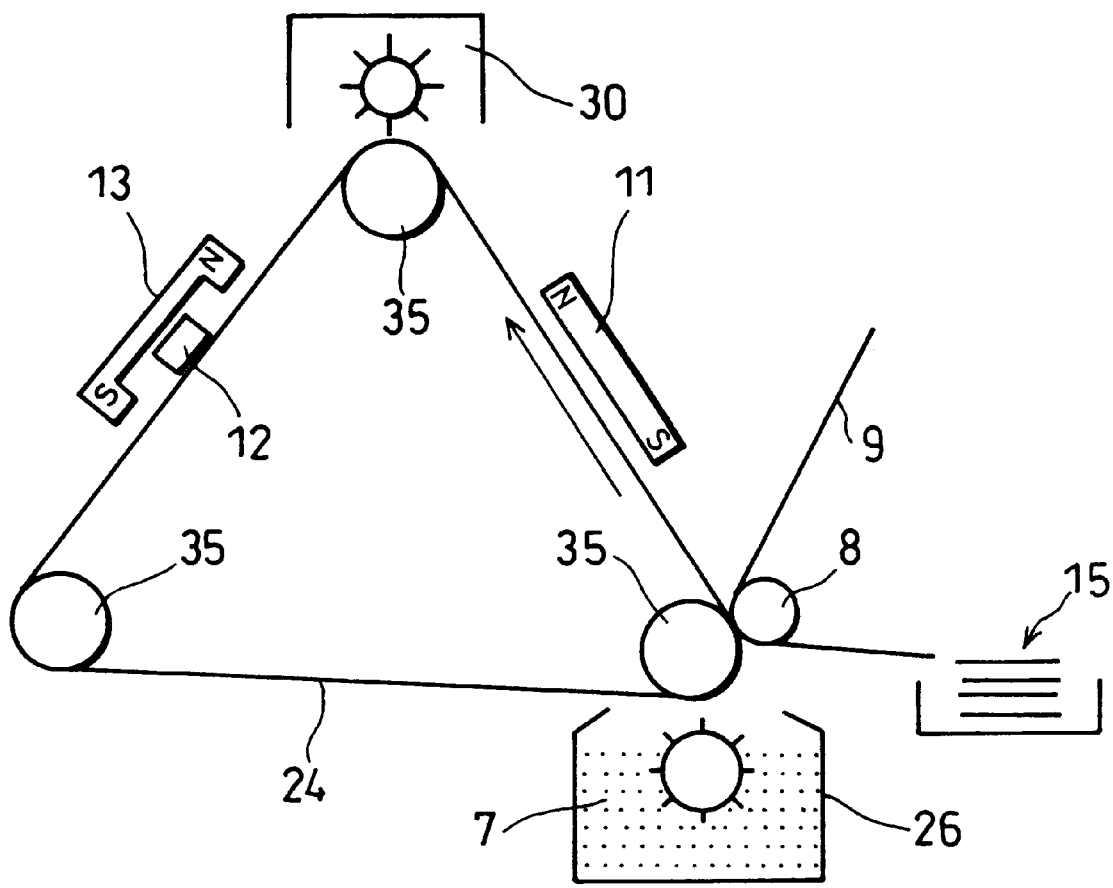
FIG. 30 is an explanatory drawing that shows another construction of the thermo-magnetic printer in accordance with Embodiment 1.

Additionally, the thermo-magnetic printer of the present invention is not intended to be limited to the one shown in FIG. 2; and as illustrated in FIG. 30, another arrangement may be adopted wherein a magnetic belt (a magnetic-latent-image-bearing body) 24 is used in an image-forming section in lieu of the magnetic drum 4. In the image-forming section in the thermo-magnetic printer of this type, the magnetic belt 24 is supported by three rollers 35, and is shifted in a direction indicated by the arrow in the Figure in accordance of rotation of the rollers 35. On the periphery of the magnetic belt 24, a one-directional magnetization magnet 11, a cleaning device 30 for removing excessive magnetic toner 7 remaining on the surface of the magnetic belt 24 without being transferred onto the sheet of recording paper 15, a thermal-head device 12 and a bias-magnetic-field applying magnet 13, a developing device 26 containing magnetic toner 7 inside, a transfer roller 8, sheets of recording paper 15 and a conveyer belt 9 are placed.

Figure 31:
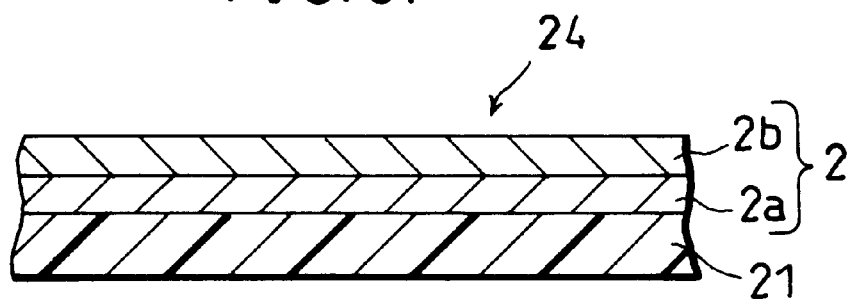
FIG. 31 is an explanatory drawing that shows a construction of a magnetic belt used in the thermo-magnetic printer of FIG. 30.

FIG. 31 is an explanatory drawing that shows the construction of the magnetic belt 24. As illustrated in this Figure, the magnetic belt 24 is made by forming the above-mentioned recording medium 2 on the surface of a film sheet 21. The film sheet 21 is made of a highpolymer material such as polyimide and polyethyleneterephthalate. The operation of the thermo-magnetic printer of this type is the same as that of the present thermo-magnetic printer shown in FIG. 2; therefore, an explanation thereof will be omitted.

The following description will discuss the construction of the magnetic recording medium 2 in the magnetic drum 4 shown in FIG. 1. As illustrated in FIG. 1, the magnetic recording medium 2 is constituted by a first magnetic film 2a and a second magnetic film 2b that are stacked on a drum base 1 by a sputtering method or an electron beam evaporation method.

The first magnetic film 2a is made of a magnetic film having a magnetic anisotropy within the in-plane of the stacked layer. With respect to this magnetic film, for example, an amorphous alloy film with a predetermined composition made of a rare-earth metal and a transition metal, such as a TbCo film, a DyCo film, a GdCo film, a TbFeCo film, a DyFeCo film, and a GdFeCo film, may be adopted. Moreover, a Co film, an alloy film of Co and Ni, an alloy film of Co and Ni, an alloy film of Co, Ni and P, an alloy film of Fe and Ni, and a ferrite film whose molecular formula is represented by $MO.Fe_2O_3$ (M stands for any of Mn, Fe, Co, Ni, Cu, Zn and Mg or a mixture of some of these elements) may be adopted. Furthermore, the film thickness of the first magnetic film 2a is preferably set in the range of 0.1 to 1.5 $\mu$m. In the description below, the direction of the magnetic anisotropy of the first magnetic film 2a is defined as the first direction.

In the same manner as the first magnetic film 2a, the second magnetic film 2b is made of a magnetic film having a magnetic anisotropy within the in-plane of the stacked layer. Here, the direction of the magnetic anisotropy in the second magnetic film 2b is different from the direction of the magnetic anisotropy in the first film 2a although they are within the in-plane of the stacked layer. With respect to a magnetic film for the second magnetic film 2b, for example, an amorphous alloy film with a predetermined composition made of a rare-earth metal and a transition metal, such as a TbCo film, a DyCo film, a GdCo film, a TbFeCo film, a DyFeCo film, and a GdFeCo film, may be adopted. Further, the film thickness of the second magnetic film 2b is preferably set in the range of 0.5 to 3.0 $\mu$m. Moreover, it is preferable for the second magnetic film 2b to be made thicker than the first magnetic film 2a. In the description below, the direction of the magnetic anisotropy of the second magnetic film 2b is defined as the second direction.

In the second magnetic film 2b in the magnetic recording medium 2 having the construction as described above, the direction of its magnetic anisotropy, that is, the magnetization direction in the initial state, is parallel to the surface, and its coercive force decreases as temperature rises. Further, in a heated state to a predetermined temperature below the Curie point, when a bias magnetic field having a direction reversed to the magnetization direction in the initialized state is applied thereto, a magnetic latent image is formed.

As will be described in detail in Examples 1 through 3 below, when, like the magnetic recording medium 2, the first magnetic film 2a, whose direction of magnetic anisotropy is different from that of the second magnetic film 2b, is formed as a base film of the second magnetic film 2b that serves as a magnetic film for forming a magnetic latent image, it is confirmed through experiments that it is possible to form a magnetic latent image in which the height of serration in the serrate magnetization transition structure appearing in the border of magnetization inversion of a magnetic latent image (hereinafter, referred to simply as the height of serration) is made smaller.

The reason for this is supposedly given as follows: As described in the aforementioned document (Electronic Information Communication Society, Papers of Magnetic Recording Seminar MR 75-29), the serrate magnetization transition structure is determined so that the total of the magnetostatic energy, the domain-wall energy, the magnetic anisotropy energy and the magneto-interactive energy, which are exerted in the second magnetic film 2b on which a magnetic latent film is formed, is minimized. It is considered that in the magnetic recording medium 2, the magnetostatic energy of the second magnetic film 2b is reduced by using the first magnetic film 2a whose direction of magnetic anisotropy is different from that of the second magnetic film 2b as a base film of the second magnetic film 2b.

Moreover, it is confirmed through experiments that when a non-magnetic layer is interpolated between the first magnetic film 2a and the second magnetic film 2b, the height of serration in a magnetic latent image is not reduced, which is different from the case of the magnetic recording medium 2. Therefore, it is considered that the reduction in the height of serration is also related to a magnetic interaction due to an exchange coupling between the first magnetic film 2a and the second magnetic film 2b.

As described above, with the magnetic recording medium 2, since the height of serration in a magnetic latent image is reduced, it becomes possible to improve the resolution of the magnetic-latent-image recording, and also to form a high-resolution magnetic latent image with a greater magnetic attracting force to the magnetic toner.

Consequently, with the above-mentioned magnetic recording medium 2, it becomes possible to form a magnetic latent image with high resolution, and also to attract magnetic toner in a stable manner. Therefore, the present thermomagnetic printer, which has the magnetic drum 4 using the magnetic recording medium 2 of this type, makes it possible to obtain recorded images with high resolution and high contrast.

Further, as described above, one of the problems with a conventional in-plane magnetization film made of an amorphous magnetic material consisting of a rare-earth metal and a transition metal is that if the film thickness is increased in order to obtain an attracting force to magnetic toner, the resolution tends to deteriorate. The product of the film thickness and the residual magnetization has effects on the resolution; and in the case of the product at a level of $300 \times 10^3$ A/m.$\mu$m (300 emu/cc.$\mu$m), the conventional in-plane magnetization film fails to provide recording with high resolution. However, even in the case of the product at a level of $300 \times 10^3$ A/m.$\mu$m (300 emu/cc.$\mu$m), the above-mentioned magnetic recording medium 2 makes it possible to carry out recording with sufficiently high resolution, and even in the case of a film thickness of 2 $\mu$m, the magnetic recording medium 2 makes it possible to carry out recording with high resolution. Moreover, even in the case of a film thickness of 3 $\mu$m, it still makes it possible to carry out recording with higher resolution as compared with the conventional magnetic recording medium.

The following Embodiment 1 through 3 will discuss measurements that were carried out in order to confirm the above-mentioned functions of the magnetic recording medium 2.

EXAMPLE 1

Figure 3A:
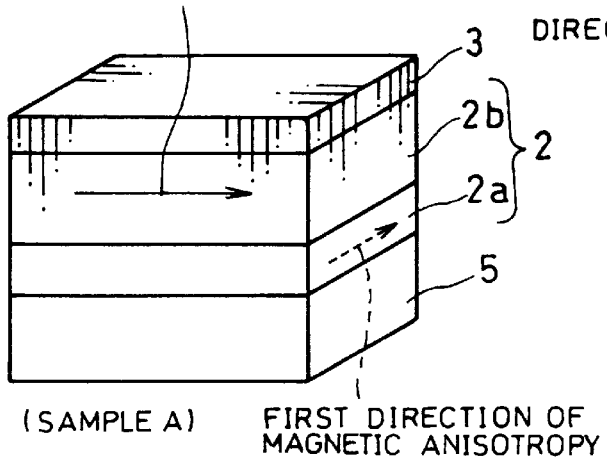
FIG. 3(a) is an explanatory drawing that shows the construction of sample A in which a magnetic recording medium in accordance with Embodiment 1 is provided.
Figure 4:
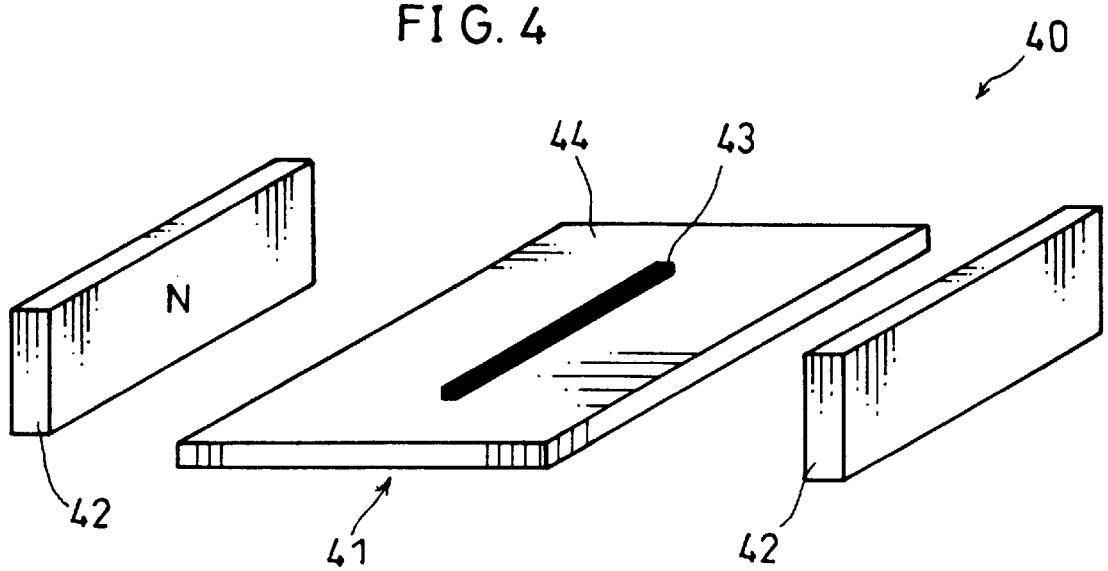
FIG. 4 is an explanatory drawing that shows a schematic construction of a magnetic-latent-image recording device in accordance with Embodiment 1.

In order to examine the magnetic recording medium 2, the manufacturing method thereof and the magnetic-latent-image recording device that are used in the present thermomagnetic printer as shown in FIG. 2, sample A that serves as a magnetic-latent-image-bearing body having a construction shown in FIG. 3(a) and a magnetic-latent-image recording device 40 shown in FIG. 4 were manufactured and evaluated.

As illustrated in FIG. 4, the magnetic-latent-image recording device 40 is constituted by a thermo-input device 41 and bias-magnetic-field applying devices 42. In the thermo-input device 41, a glass substrate 44, on which an Ni thin-film 43 measuring 30 μm in width, 5 mm in length and 1.0 μm in thickness is formed as a heat-generating resistor, is placed between the bias-magnetic-field applying devices 42.

The magnetic-latent-image recording device 40 allows the Ni thin-film 43 and the magnetic recording medium 2 to contact each other under a bias magnetic field being applied, and makes the Ni thin-film 43 conduct by applying an ac voltage thereto, allowing the Ni thin-film to generate heat so as to carry out a thermal input to the magnetic recording medium 2.

FIG. 3(a) is an explanatory drawing that shows a schematic construction of sample A. As shown in this Figure, sample A is constituted by a magnetic recording medium 2 and a protective layer 3 that are stacked on a glass substrate 5 in this order. A material manufactured by Corning Inc. is used as the glass substrate 5, and toner manufactured by Hitachi metals, Ltd. (H700, the amount of magnetic powder: 70%, the average particle diameter: 12.2 μm) is used as the magnetic toner 7 in the developing device 6. Further, in the present embodiment, sample A was manufactured by a sequence of processes ① through ③ as follows:

① On the glass substrate 5, by using a composite target with a Co target carrying a Tb chip so as to attain a predetermined composition, a first magnetic film 2a, made of a TbCo amorphous alloy film with a thickness of 0.4 μm, was formed by a sputtering method while applying a magnetic field in the first in-plane direction.

② Successively, on the first magnetic film 2a, by using a composite target with a Co target carrying a Tb chip so as to attain a predetermined composition in the same manner, a second magnetic film 2b, made of a TbCo amorphous alloy film with a thickness of 1.5 μm, was formed by a sputtering method while applying a magnetic field in the second in-plane direction that is different from the first direction.

③ Further, a TiN film with a thickness of 0.1 μm is formed as a protective film 3 by using a sputtering method in the same manner.

Both of the magnetic films 2a and 2b had a Tb composition of 11.0 atom %.

Figure 3C:
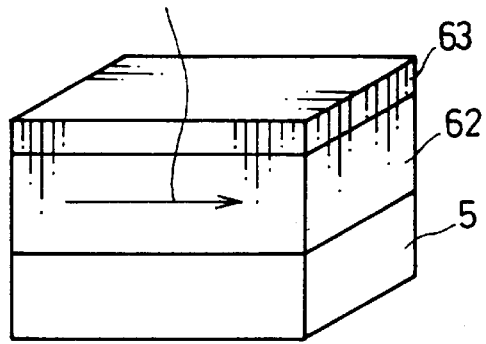
FIG. 3(c) is an explanatory drawing that shows the construction of sample B that is given as a comparative example.
Figure 3B:
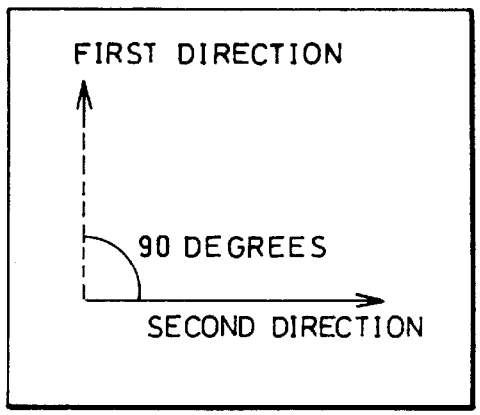
FIG. 3(b) is an explanatory drawing that indicates an angle made by the direction of magnetic anisotropy of the first magnetic film and the direction of magnetic anisotropy of the second magnetic film in the magnetic recording medium of sample A.

FIG. 3(b) is an explanatory drawing that indicates the angle made by the direction of magnetic anisotropy of the first magnetic film 2a and the direction of magnetic anisotropy of the second magnetic film 2b in the magnetic recording medium 2 of sample A. As shown in this Figure, sample A is arranged so that the first direction corresponding to the direction of in-plane magnetic anisotropy of the first magnetic film 2a and the second direction corresponding to the direction of in-plane magnetic anisotropy of the second magnetic film 2b make an angle of 90 degrees, that is, the directions are orthogonal to each other. Here, the sputtering processes ① through ③ were carried out by a high-frequency sputtering method in which no bias voltage is applied.

Figure 5:
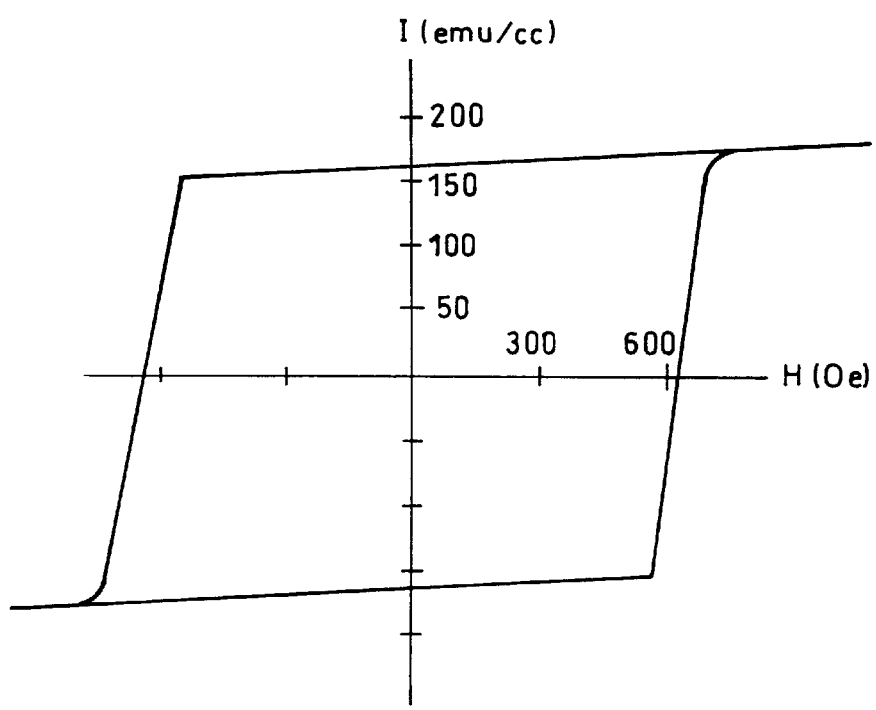
FIG. 5 is a graph that shows the results of hysteresis-loop measurements carried out on the magnetic recording medium of sample A at room temperature.

FIG. 5 shows the results of measurements on the hysteresis loop in the second magnetic film 2b in the magnetic recording medium 2 with respect to sample A manufactured as described above. The measurements were carried out by applying a magnetic field in the direction of magnetic anisotropy of the second magnetic film 2b of the magnetic recording medium 2 in sample A. This Figure shows that at room temperature, the coercive force of the second magnetic film 2b is 49000 A/m (620 Oe) and the residual magnetization is 160×10³ A/m (160 emu/cc).

Figure 6:
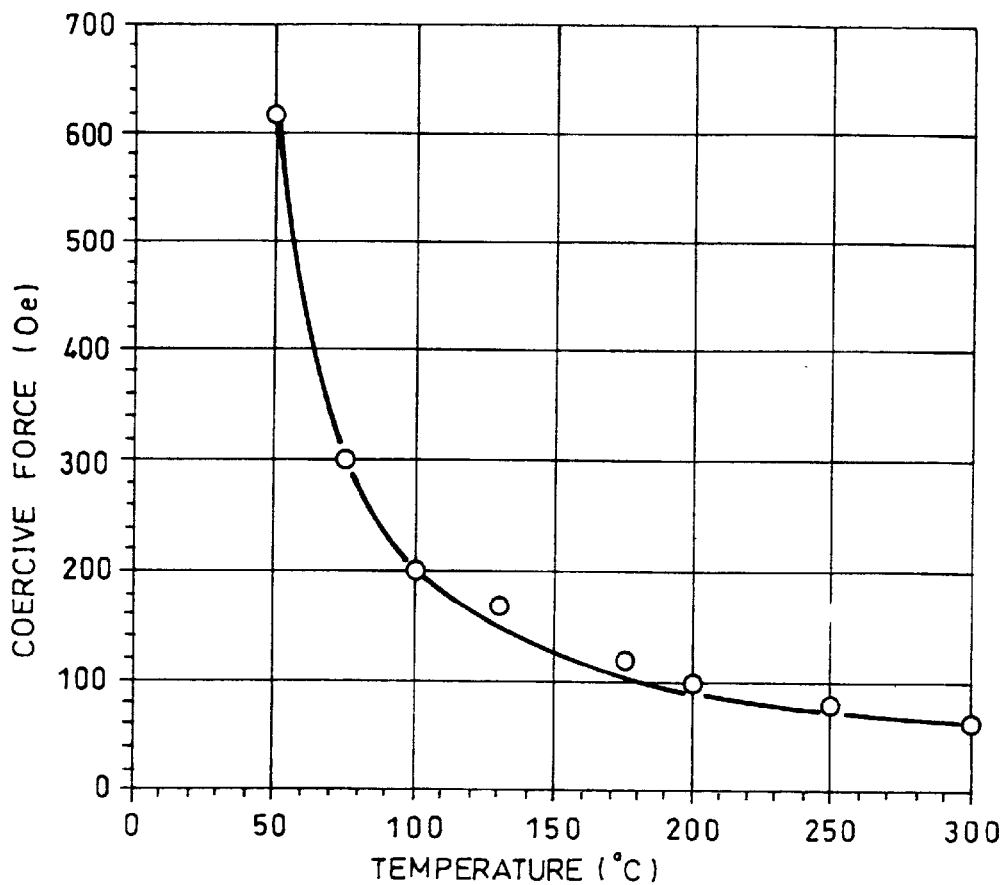
FIG. 6 is a graph that shows the results of measurements on the temperature dependence of coercive force in the magnetic recording medium of sample A.

Further, FIG. 6 shows the temperature dependence of coercive force, which was found by the measurements on the hysteresis loop of sample A carried out by changing temperatures while applying a magnetic field in the direction of magnetic anisotropy of the second magnetic film 2b in sample A. This Figure indicates that the coercive force of the second magnetic film 2b in the magnetic recording medium 2 decreases as temperature rises.

Moreover, after preliminarily applying an initialization magnetic field to sample A in the direction of magnetic anisotropy of the magnetic film 2b until it attained a saturated state, a recording test was carried out by using the magnetic-latent-image recording device 40 shown in FIG. 4 so that a magnetic latent image was formed on sample A, and then a developing test was made by scattering magnetic toner to the magnetic latent image that had been formed. As a result, the magnetic toner adhered thereto in a line shape with a width of 180 μm so that a good visual image was obtained. Here, the formation of the magnetic latent image onto sample A was carried out as follows: while the bias-magnetic-field applying device 42 was applying a bias magnetic field of 24000 A/m (300 Oe) in a direction reversed to the direction of the initializing magnetic field, the magnetic-latent-image recording device 40 allowed the magnetic recording medium 2 and the Ni thin-film 43 of the thermo-input device 41 to contact each other while a dc voltage of 15 V was applied to the Ni thin-film 43 for 20 msec.

Figure 7A:
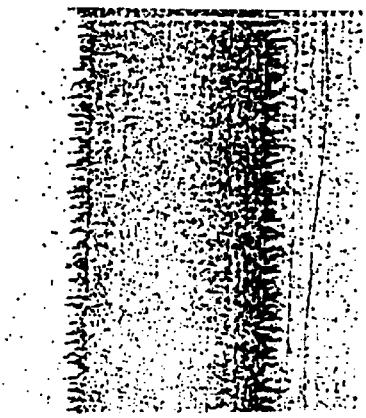
FIG. 7(a) is an explanatory drawing that indicates a magnetic latent image formed on the magnetic recording medium of sample A.
Figure 7B:
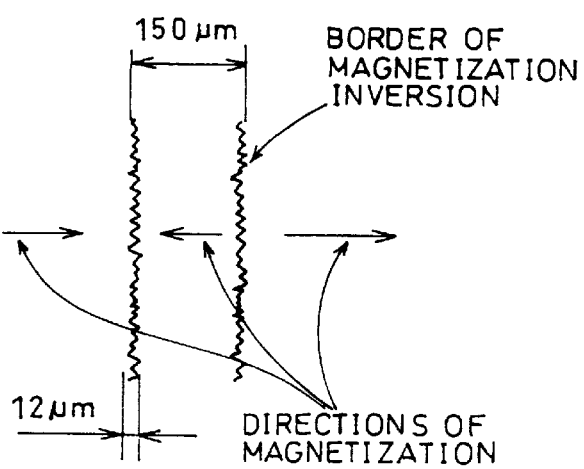
FIG. 7(b) is an explanatory drawing that schematically shows the magnetic latent image shown in FIG. 7(a).

Moreover, when the magnetic latent image on the magnetic recording medium 2 in sample A, formed by the above-mentioned recording test, was observed by using a powder chart-forming method, a magnetic latent image, as shown in FIG. 7(a), was obtained. FIG. 7(b) is an explanatory drawing that schematically shows the magnetic latent image. As illustrated in this Figure, the width of the magnetic latent image was 150 μm, and the height of serration in the serrate magnetization transition structure formed in the border of magnetization inversion in the magnetic latent image (hereinafter, referred to simply as the height of serration) was as low as 12 μm.

Here, the recording test is a test for formation of magnetic latent images, and the following developing test is a test for visualization of magnetic latent images by the use of magnetic toner.

Next, in order to carry out a high-resolution recording operation using sample A, the recording test and the developing test were conducted by changing the application of electric power to the Ni thin-film 43 in the magnetic-latent-image recording device 40 to a dc voltage of 15 V for 10 msec. As a result, since the thermo-input time was shortened, the region of the magnetic recording medium 2 in which the magnetization direction is inverted by the bias magnetic field of 24000 A/m (300 Oe) became narrower so that magnetic toner adhered thereto in a line shape with a width of 80 μm, making it possible to obtain a good visual image.

Figure 8:
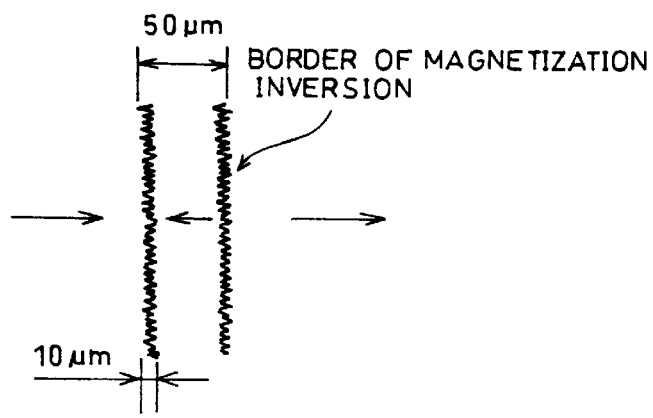
FIG. 8 is an explanatory drawing that schematically shows a magnetic latent image that has been formed in a shortened thermo-input time in the magnetic recording medium of sample A.

Moreover, the magnetic latent image, formed on the magnetic recording medium 2 by the above-mentioned recording test, was observed by using a powder chart-forming method, and the result is schematically shown in FIG. 8. As illustrated in this Figure, the width of the magnetic latent image is 50 μm, and the height of serration is as low as 10 μm.

Furthermore, in order to carry out a higher-resolution recording operation using sample A, the recording test and the developing test were conducted by changing the application of electric power to the Ni thin-film 43 to a dc voltage of 15 V for 7 msec. Consequently, magnetic toner adhered to sample A in a line shape with a width of 60 μm, making it possible to obtain a good visual image.

Figure 9:
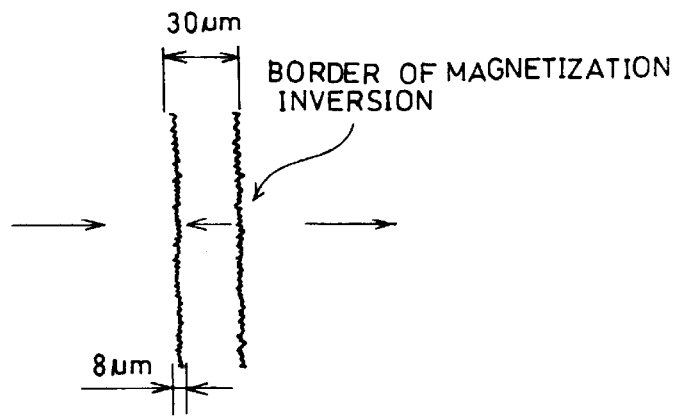
FIG. 9 is an explanatory drawing that schematically shows a magnetic latent image that has been formed in a further shortened thermo-input time in the magnetic recording medium of sample A.

The magnetic latent image, formed on the magnetic recording medium 2 by the above-mentioned recording test, was observed by using a powder chart-forming method, and the result is schematically shown in FIG. 9. As illustrated in this Figure, the width of the magnetic latent image is 30 μm, and the height of serration is as low as 8 μm.

Next, for comparative purposes, sample B, as shown in FIG. 3(c), was manufactured. In the same manner as sample A, sample B was manufactured by a sequence of processes as follows: On the glass substrate 5, by using a composite target with a Co target carrying a Tb chip so as to attain a predetermined composition, a magnetic recording medium 62, made of a TbCo amorphous alloy film with a thickness of 1.5 μm, was formed by a sputtering method while applying a magnetic field in one in-plane direction, and on it was formed a TiN film with a thickness of 0.1 μm also by using a sputtering method as a protective film 63.

Figure 10:
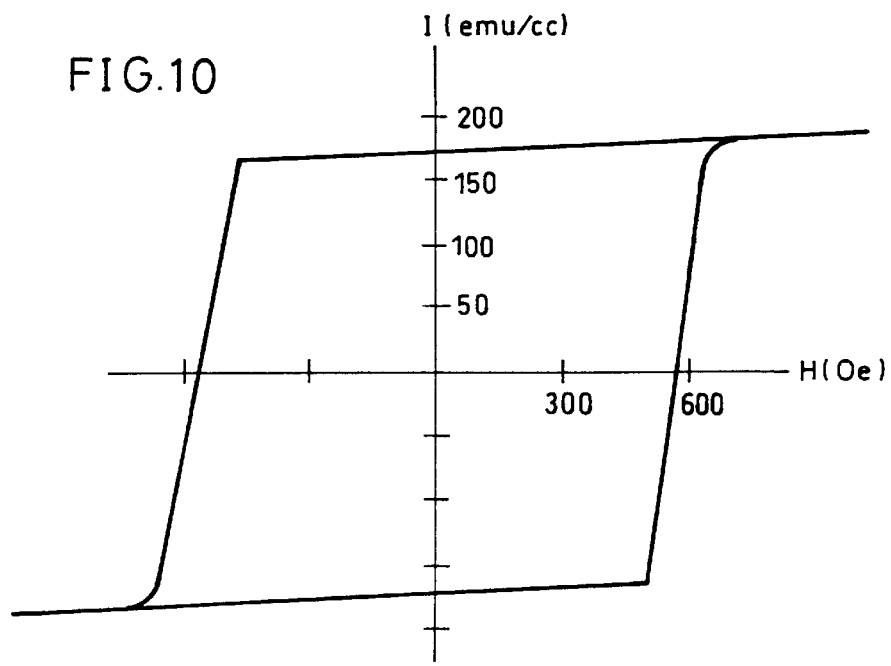
FIG. 10 is a graph that shows the results of hysteresis-loop measurements carried out on the magnetic recording medium of sample B.

The TbCo amorphous alloy film in sample B is an in-plane magnetic film having a magnetic anisotropy in one in-plane direction, and had a Tb composition of 11.0 atom %. Here, the above-mentioned sputtering processes were carried out by a high-frequency sputtering method in which no bias voltage is applied. FIG. 10 shows the results of measurements on the hysteresis loop at room temperature in the magnetic recording medium 62 with respect to sample B manufactured as described above. The measurements were carried out by applying a magnetic field in the direction of magnetic anisotropy of the magnetic recording medium 62.

FIG. 10 shows that at room temperature, the coercive force of the magnetic recording medium 62 is 45000 A/m (570 Oe) and the residual magnetization is 170×10³ A/m (170 emu/cc), and it is found that the magnetic characteristics are virtually the same as those of the magnetic recording medium 2 of sample A shown in FIG. 5.

Moreover, after preliminarily applying an initialization magnetic field to sample B in the direction of magnetic anisotropy of the magnetic recording medium 62 until it attained a saturated state, the recording test was carried out by using the magnetic-latent-image recording device 40 shown in FIG. 4 so that a magnetic latent image was formed, and then the developing test was made by scattering magnetic toner onto the magnetic latent image that had been formed. Consequently, the magnetic toner adhered thereto in a line shape with a width of 250 μm, resulting in an insufficient adhesion of the magnetic toner. Here, the formation of the magnetic latent image onto sample B was carried out in the same manner as the case in which the magnetic latent image was recorded on sample A. In other words, while the bias-magnetic-field applying device 42 was applying a bias magnetic field of 24000 A/m (300 Oe) in a direction reversed to the direction of the initializing magnetic field, the magnetic-latent-image recording device 40, shown in FIG. 4, allowed the magnetic recording medium 2 and the Ni thin-film 43 of the thermo-input device 41 to contact each other while a dc voltage of 15 V was applied to the Ni thin-film 43 for 20 msec.

Figure 11A:
FIG. 11(a) is an explanatory drawing that shows a magnetic latent image formed on the magnetic recording medium of sample B.
Figure 11B:
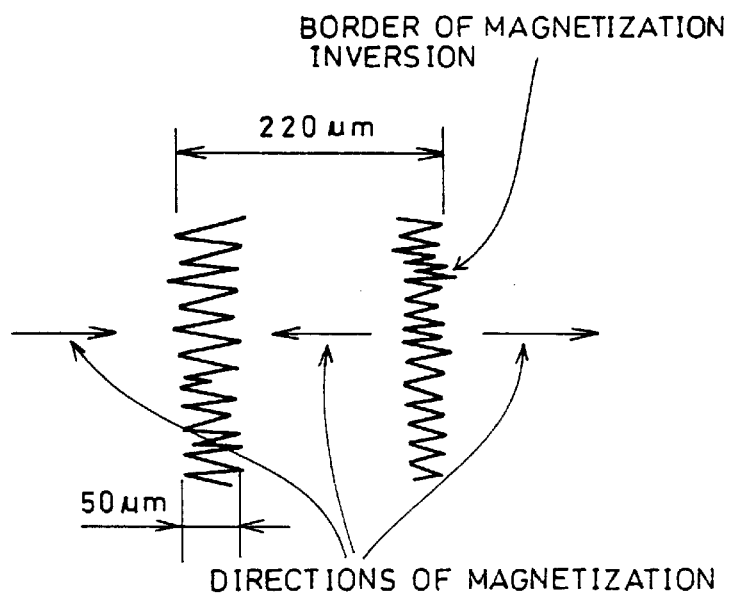
FIG. 11(b) is an explanatory drawing that schematically indicates the magnetic latent image shown in FIG. 11(a).

When the magnetic latent image on the magnetic recording medium 62 in sample B, formed by the above-mentioned recording test, was observed by using a powder chart-forming method, a magnetic latent image, as shown in FIG. 11(a), was obtained. FIG. 11(b) is an explanatory drawing that schematically shows the magnetic latent image. As illustrated in this Figure, the width of the magnetic latent image was 220 μm, which was wider than the width of the magnetic latent image that had been formed on sample A under the same recording conditions. In addition, the height of serration was 50 μm, which was higher than the height of serration (see FIGS. 7(a) and 7(b)) that had been formed on sample A under the same recording conditions. Thus, in sample B, the height of serration in the serrate magnetization transition structure formed in the border of magnetization inversion is higher than the height of serration in sample A, resulting in a reduction in the magnetic attracting force to magnetic toner.

Further, in order to carry out a high-resolution recording operation using sample B, the recording test and the developing test were conducted by changing the application of electric power to the Ni thin-film 43 to a dc voltage of 15 V for 10 msec. As a result, since the thermo-input time was shortened, the region of the magnetic recording medium 62 in which the magnetization direction is inverted by the bias magnetic field of 24000 A/m (300 Oe) became narrower so that magnetic toner adhered thereto in a line shape with a width of 160 μm. This case merely provides a wider width as compared with the case in which the magnetic latent image was formed on the sample A under the same recording conditions and developed by magnetic toner. In addition, the amount of magnetic-toner adhesion is insufficient as compared with sample A.

Figure 12:
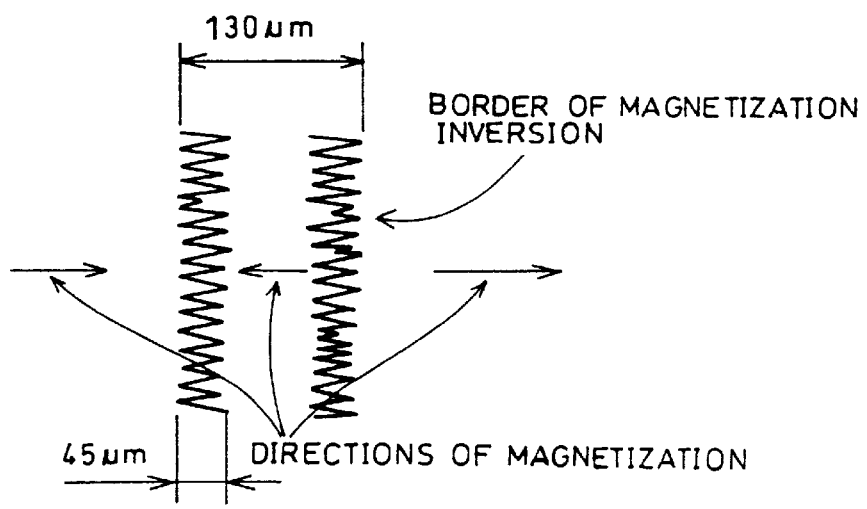
FIG. 12 is an explanatory drawing that schematically shows a magnetic latent image that has been formed in a shortened thermo-input time in the magnetic recording medium of sample B.

Moreover, the magnetic latent image, formed on the magnetic recording medium 62 by the above-mentioned recording test, was observed by using a powder chart-forming method, and the result is schematically shown in FIG. 12. As illustrated in this Figure, the width of the magnetic latent image is 130 μm, which is wider than the width of the magnetic latent image formed on sample A under the same recording conditions. Further, the height of serration is 45 μm, which is higher than the height of serration of the magnetic latent image (see FIG. 8) formed on sample A under the same recording conditions. This suggests that the greater height of serration results in a reduction in the magnetic attracting force to magnetic toner.

Furthermore, in order to carry out a higher-resolution recording operation using sample B, the recording test and the developing test were conducted by changing the application of electric power to the Ni thin-film 43 to a dc voltage of 15 V for 7 msec. Consequently, magnetic toner adhered in a line shape with a width of 120 μm, resulting in a serious insufficiency in the amount of toner adhesion.

Figure 13A:
FIG. 13 (a) is an explanatory drawing that schematically shows a magnetic latent image that has been formed in a further shortened thermo-input time in the magnetic recording medium of sample B.
Figure 13B:
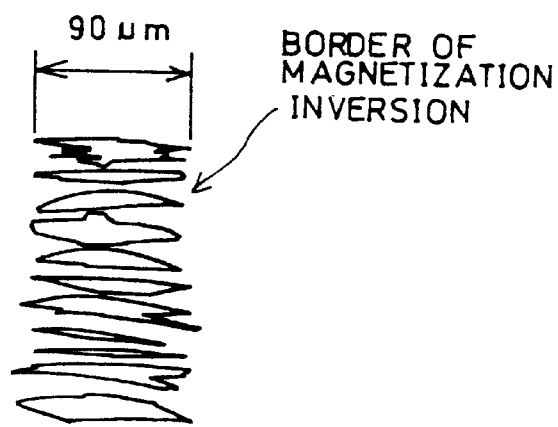

The magnetic latent image, formed on the magnetic recording medium 62 by the above-mentioned recording test, was observed by using a powder chart-forming method; as a result, the magnetic latent image as shown in FIG. 13(a) was obtained. Further, FIG. 13(b) is an explanatory drawing that schematically shows the magnetic latent image. As illustrated in this Figure, although the width of the magnetic latent image was 90 μm, a continuous line-shaped border of magnetization inversion was not formed. This suggests that failure to properly form the continuous line-shaped border of magnetization inversion results in a reduction in the magnetic attracting force to magnetic toner.

Next, an explanation will be given of the angle made by the directions of magnetic anisotropies of the first magnetic film 2a and the second magnetic film 2b.

Figure 14A:
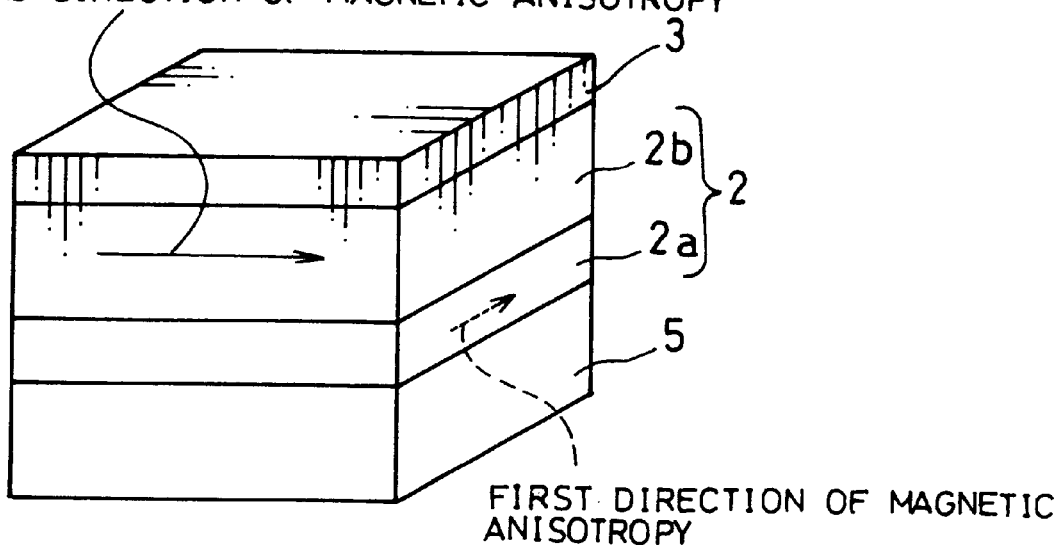
FIG. 14(a) is an explanatory drawing that shows the construction of sample C in which a magnetic recording medium in accordance with Embodiment 1 is provided.
Figure 14B:
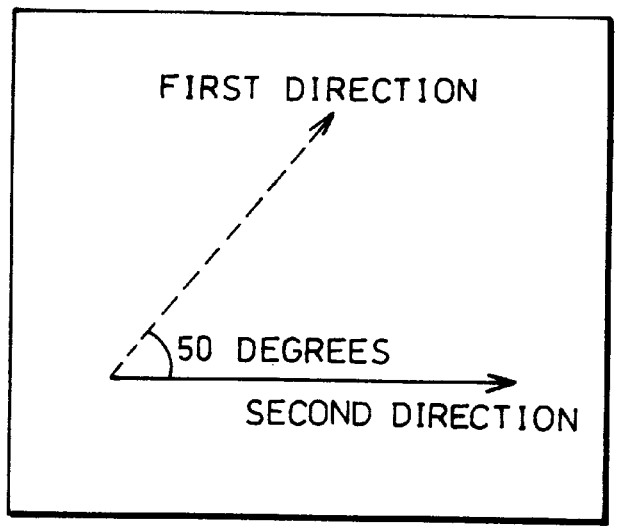
FIG. 14(b) is an explanatory drawing that indicates an angle made by the direction of magnetic anisotropy of the first magnetic film and the direction of magnetic anisotropy of the second magnetic film in the magnetic recording medium of sample C.

FIG. 14 (a) is an explanatory drawing that schematically shows the construction of sample C. In the same manner as sample A, sample C is constituted by a glass substrate 5, a magnetic recording medium 2 and a protective layer 3 that are stacked in this order. The magnetic recording medium 2 of sample C is a stacked layer of the first magnetic film 2a and the second magnetic film 2b that are made of the same materials and have the same film thicknesses as those of the magnetic recording medium 2 of sample A. Further, FIG. 14(b) is an explanatory drawing that indicates the angle made by the directions of magnetic anisotropies of these magnetic films 2a and 2b. As shown in this Figure, the angle in sample C is set at 50 degrees. The following description will discuss the results of developing tests that were carried out using sample C.

Figure 15:
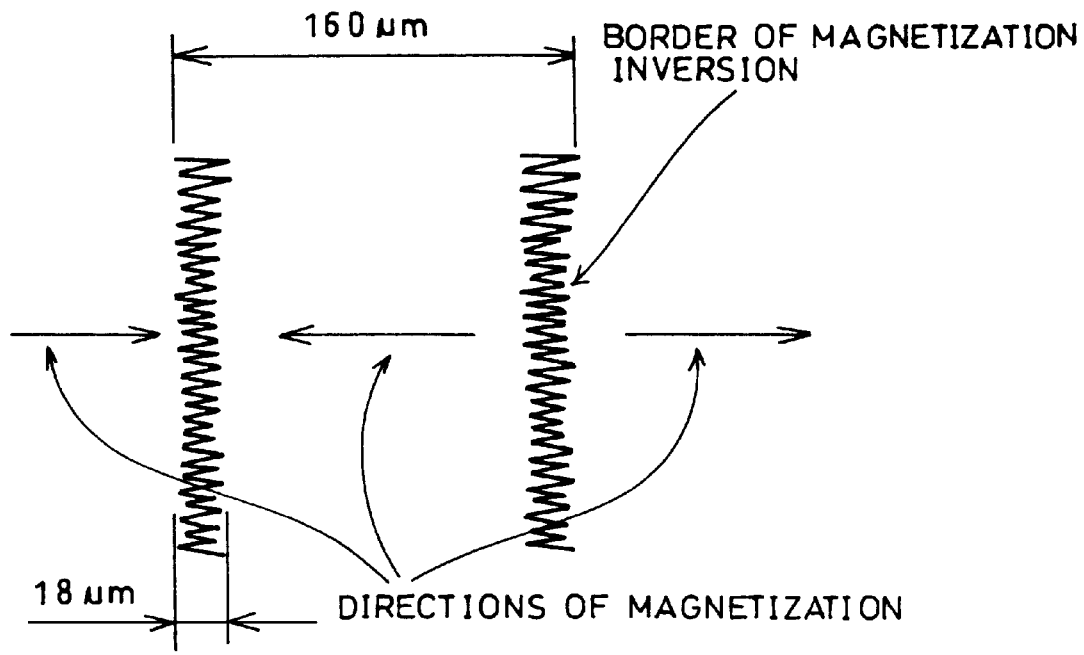
FIG. 15 is an explanatory drawing that schematically shows a magnetic latent image formed on the magnetic recording medium of sample C.

FIG. 15 is an explanatory drawing that schematically shows the results of the following observation: After having applied an initializing magnetic field in the direction of magnetic anisotropy of the second magnetic film 2b in the magnetic recording medium 2 of sample C until it attains a saturated state, a magnetic latent image was formed thereon by the magnetic-latent-image recording device 40 shown in FIG. 4, and the magnetic latent image thus formed was observed by using a powder chart-forming method. As shown in this Figure, the width of the magnetic latent image is 160 μm, which is wider than the width of the magnetic latent image that was formed on sample A under the same recording conditions; however, the height of serration formed in the border of magnetization inversion is 18 μm, which is smaller than the height of serration that was formed on sample B under the same conditions in the same manner as sample A. This indicates that sample C makes it possible to record a magnetic latent image with high resolution. Here, the formation of the magnetic latent image on sample C was carried out as follows: while the bias-magnetic-field applying device 42 was applying a bias magnetic field of 24000 A/m (300 Oe) in a direction reversed to the direction of the initializing magnetic field, the magnetic-latent-image recording device 40 allowed the magnetic recording medium 2 and the Ni thin-film 43 of the thermo-input device 41 to contact each other while a dc voltage of 15 V was applied to the Ni thin-film 43 for 20 msec.

As described above, the magnetic recording medium 2 is manufactured in such a manner that on the first magnetic film 2a having a magnetic anisotropy in the first in-plane direction, the second magnetic film 2b, which is an amorphous alloy film consisting of a rare-earth metal and a transition metal and which has a magnetic anisotropy in the second in-plane direction different from the first direction is formed; therefore, this arrangement makes it possible to form a magnetic latent image which has a reduced height of serration in the serrate magnetization transition structure appearing in the border of magnetization inversion of a magnetic latent image. Thus, it becomes possible to increase the resolution of the magnetic latent image recording, and also to form a magnetic latent image with high resolution having a great magnetic attracting force to magnetic toner.

Consequently, the magnetic recording medium 2 of this type makes it possible to form a magnetic latent image with high resolution and also to attract magnetic toner in a stable manner; therefore, when the magnetic recording medium 2 of this type is applied to thermo-magnetic printers, it becomes possible to provide a thermo-magnetic printer capable of producing recorded images with high resolution and high contrast.

Additionally, the present embodiment was explained by exemplifying a case wherein TbCo, which serves as an amorphous alloy film consisting of a rare-earth metal and a transition metal, is used for both the first and second magnetic films 2a and 2b; however, the present invention is not intended to be limited thereby. Another amorphous alloy film consisting of a rare-earth metal and a transition metal, such as DyCo and GdCo, may be adopted as the first and second magnetic films 2a and 2b. Further, even in the case when the first magnetic film 2a is made of a DyCo amorphous alloy film and the second magnetic film 2b is made of a GdCo amorphous alloy film, that is, even in the case when amorphous alloy films having a different combination of rare-earth metals and transition metals are used, the above-mentioned functions of the magnetic recording medium 2 are unchanged, as long as the magnetic recording medium 2 is arranged in such a manner that on the first magnetic film 2a having a magnetic anisotropy in the first in-plane direction, the second magnetic film 2b, which is an amorphous alloy film consisting of a rare-earth metal and a transition metal and which has a magnetic anisotropy in the second in-plane direction different from the first direction, is formed.

Moreover, even in the case when the first magnetic film 2a is another magnetic film, such as a Co film, an alloy film of Co and Ni, an alloy film of Co, Ni and P, an alloy film of Fe and Ni, or a ferrite film whose molecular formula is represented by $MO.Fe_2O_3$ (M stands for any of Mn, Fe, Co, Ni, Cu, Zn and Mg or a mixture of some of these elements), or a mixed film of some of these materials, the above-mentioned functions of the magnetic recording medium 2 are unchanged, as long as the magnetic recording medium 2 is arranged in such a manner that on the first magnetic film 2a having a magnetic anisotropy in the first in-plane direction, the second magnetic film 2b, which is an amorphous alloy film consisting of a rare-earth metal and a transition metal and which has a magnetic anisotropy in the second in-plane direction different from the first direction, is formed.

Furthermore, in the case when a TbCo amorphous alloy is used as a material for the first magnetic film 2a and the second magnetic film 2b as in sample A or other constructions, as the amount of Tb increases, the coercive forces of the magnetic films 2a and 2b become higher, resulting in a great reduction in the coercive force at elevated temperatures; however, the residual magnetization becomes smaller, resulting in a reduction in the toner attracting force. In contrast, as the amount of Tb decreases, the coercive force becomes smaller although the residual magnetization increases, resulting in degradation in the recording stability as well as resulting in little reduction in the coercive force at elevated temperatures. When a TbCo amorphous alloy having little amount of Tb is used for the magnetic films 2a and 2b, it is necessary to increase the bias magnetic field to be applied by the bias-magnetic-field applying magnet 13 or to increase the thermal input by the thermal head device 12. However, there is a limitation in the input quantity of heat by the thermal head device 12, and if the bias magnetic field, applied by the bias-magnetic-field applying magnet 13, is increased, the magnetic attracting force is reduced since a great reduction in magnetization appears in the non-recording region. In this way, there is a trade-off relationship between the coercive force and the residual magnetization, and with respect to the TbCo amorphous alloy used for the first magnetic film 2a and the second magnetic film 2b in the magnetic recording medium 2, it is considered that an optimum amount of Tb is in the range of 10 to 12 atom %. Additionally, this is also applied to the case in which materials other than a TbCo amorphous metal are used; and an optimum composition is determined depending on the possibility of thermo-magnetic recording and the magnitude of the magnetic attracting force.

In the present embodiment, a TbCo amorphous alloy film whose Tb composition is 11 atom % was used as the first magnetic film 2a and the second magnetic film 2b, and the film had a coercive force of 49000 A/m (620 Oe) and a residual magnetization of 160×10³ A/m (160 emu/cc). Further, the bias magnetic field, used for forming a magnetic latent image, was 24000 A/m (300 Oe). As illustrated in FIG. 6, with respect to the material for the second magnetic film 2b, it is definitely required that the coercive force decrease as temperature rises; and in order to carry out recording by inverting the magnetization direction at 24000 A/m (300 Oe) by the use of the above-mentioned material, it is necessary to raise its temperature to not less than 70° C. In this case, the temperature 70° C. can not be attained without applying heat intentionally, and the magnetic field 24000 A/m (300 Oe) also can not be achieved without applying a magnetic field intentionally. Further, the coercive force 49000 A/m (620 Oe) is a value at which the region of magnetization inversion in a recorded magnetic latent image becomes sufficiently stable at room temperature.

Moreover, in order to increase the magnetic attracting force to magnetic toner, the magnitudes of the coercive force and the residual magnetization of the first magnetic film 2a and the second magnetic film 2b at room temperature are preferably set at not less than 24000 A/m (300 Oe) and at not less than 150×10³ A/m (150 emu/cc) respectively.

EXAMPLE 2

Next, the following description will discuss the relationship between the angle made by the direction of magnetic anisotropy of the first magnetic film 2a and the direction of magnetic anisotropy of the second magnetic film 2b in the magnetic recording medium 2 used for the present thermomagnetic printer and the height of serration of magnetic latent images in the case when those magnetic latent images were formed on the magnetic recording medium 2 repeatedly.

Figure 16:
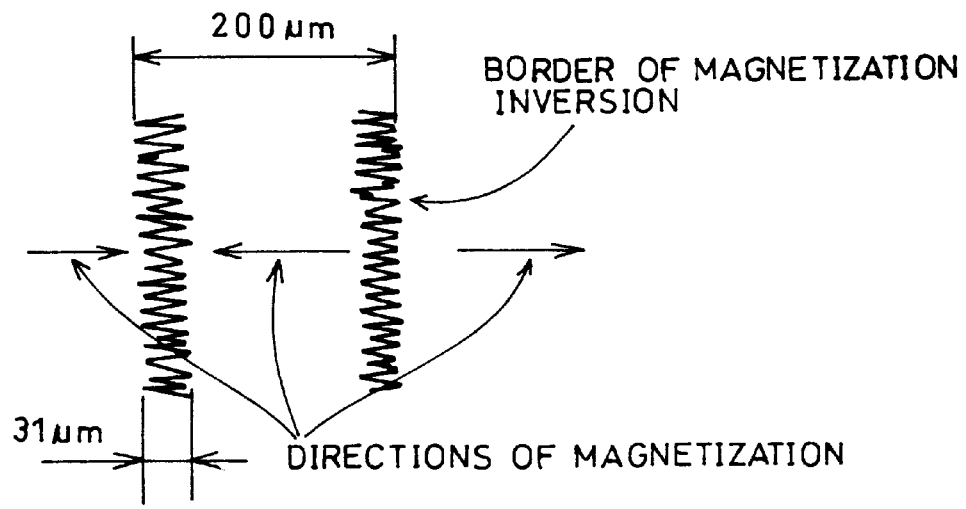
FIG. 16 is an explanatory drawing that schematically shows a magnetic latent image formed on the magnetic recording medium of sample D in accordance with Embodiment 1.

FIG. 16 is an explanatory drawing that schematically shows the results of developing tests carried out on sample D which will be described below. Sample D is designed so that in the construction of sample A, the angle made by the direction of magnetic anisotropy of the first magnetic film 2a and the direction of magnetic anisotropy of the second magnetic film 2b is set at 30 degrees.

In these developing tests, after preliminarily applying an initialization magnetic field in the direction of magnetic anisotropy of the second magnetic film 2b in the magnetic recording medium 2 of sample D until it attained a saturated state, a magnetic latent image was formed by using the magnetic-latent-image recording device 40 shown in FIG. 4. In this case, the formation of the magnetic latent image was carried out as follows: While the bias-magnetic-field applying device 42 was applying a bias magnetic field of 24000 A/m (300 Oe) in a direction reversed to the direction of the initializing magnetic field, the magnetic recording medium 2 and the Ni thin-film 43 of the thermo-input device 41 were allowed to contact each other with a dc voltage of 15 V being applied to the Ni thin-film 43 for 20 msec. Thereafter, with respect to the magnetic latent image, after preliminarily applying an initialization magnetic field in the direction of magnetic anisotropy of the magnetic film 2b until it attained a saturated state, the same magnetic latent image was again formed. In other words, the initialization and the formation of the magnetic latent image were repeated 200 times in the tests. FIG. 16 is an explanatory drawing that schematically shows the result of observation of a magnetic latent image that was formed on the magnetic recording medium 2 of sample D in the 200th recording operation.

As illustrated in this Figure, the width of the magnetic latent image formed by the developing test is 200 μm, which is wider than the width of the magnetic latent image formed on sample A under the same recording conditions. Further, the height of serration is 31 μm, which is smaller than the height of serration formed on sample B under the same recording conditions, but greater than the height of serration formed on sample A under the same recording conditions. This supposedly indicates that since the angle made by the direction of magnetic anisotropy of the first magnetic film 2a and the direction of magnetic anisotropy of the second magnetic film 2b is as small as 30 degrees, after the repeated recording operations by thermo-inputs under application of an external magnetic field, the direction of magnetic anisotropy of the first magnetic film becomes closer to the direction of magnetic anisotropy of the second magnetic film due to the influence of the external magnetic field, resulting in an increase in the height of serration in the magnetic latent image.

Figure 17:
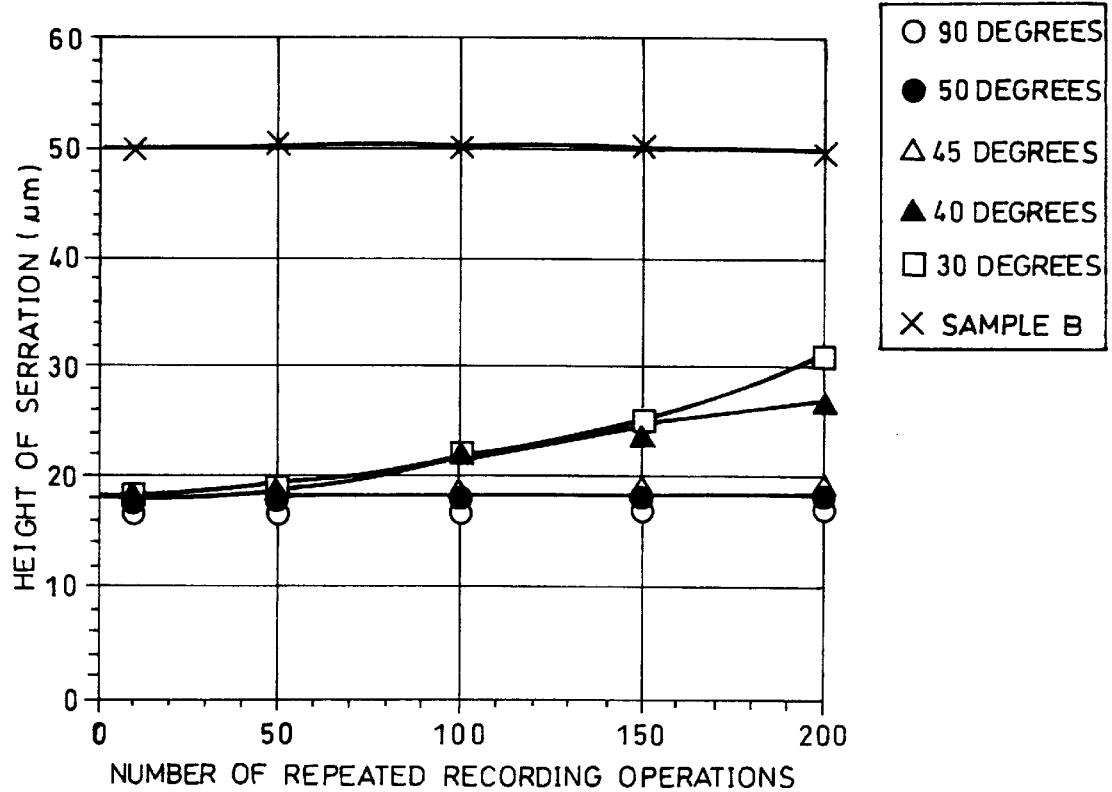
FIG. 17 is a graph that shows the relationship between the number of repeated recording operations and the height of serration of the resulting magnetic latent images in the case of magnetic recording media of five samples in which the angle made by the direction of magnetic anisotropy of the first magnetic film and the direction of magnetic anisotropy of the second magnetic film is varied to 30, 40, 45, 50 and 90 degrees respectively in the construction of sample A as well as in the case of magnetic recording media of sample B.

FIG. 17 is a graph that shows the relationship between the number of repeated recording operations and the height of serration of the resulting magnetic latent images in the case of sample group #1 consisting of five samples in which the angle made by the direction of magnetic anisotropy of the first magnetic film 2a and the direction of magnetic anisotropy of the second magnetic film 2b in the magnetic recording medium 2 is varied to 30, 40, 45, 50 and 90 degrees respectively in the construction of sample A, as well as in the case of magnetic recording media of sample B.

Here, the repeated recording operations were carried out as follows:

①  An initialization magnetic field was preliminarily applied to each of the respective samples in the direction of magnetic anisotropy of the magnetic film that was to be subjected to magnetic recording until it attained a saturated state.

② While the bias-magnetic-field applying device 42 was applying a bias magnetic field of 24000 A/m (300 Oe) in a direction reversed to the direction of the initializing magnetic field, the magnetic-latent-image recording device 40, shown in FIG. 4, allowed the magnetic recording medium 2 and the Ni thin-film 43 of the thermo-input device 41 to contact each other while a dc voltage of 15 V was applied to the Ni thin-film 43 for 20 msec.

③ After the resumed initialization, a recording operation was carried out by applying the thermo-input to the same location as the magnetic latent image previously recorded.

In the above-mentioned process ①, the magnetic film that was to be subjected to magnetic recording refers to the second magnetic film 2b in the case of the samples of sample group #1, and refers to the magnetic recording medium 62 in the case of sample B.

As illustrated in FIG. 17, in the samples in which the angle made by the direction of magnetic anisotropy of the first magnetic film 2a and the direction of magnetic anisotropy of the second magnetic film 2b is smaller than 45 degrees, the height of serration in the recorded magnetic latent image becomes greater as the number of recording operations increases during repeated recording operations. In contrast, in those samples in which the above-mentioned angle is not less than 45 degrees, the height of serration in the recorded magnetic latent image remains small, that is, not more than 20 μm, even after the repeated recording operations.

In addition, with respect to the angle a that is not less than 90 degrees, the result is equivalent to the case of the angle 180 degrees—α (for example, the case of 120 degrees is equivalent to the case of 60 degrees.)

As described above, in the magnetic recording medium 2 having a construction wherein on the first magnetic film 2a having a magnetic anisotropy in the first in-plane direction, the second magnetic film 2b, which is an amorphous alloy film consisting of a rare-earth metal and a transition metal and which has a magnetic anisotropy in the second in-plane direction different from the first direction, is formed, if the angle made by the first direction and the second direction is set in the range from not less than 45 degrees to not more than 90 degrees, it becomes possible to form a magnetic latent image in which the height of serration is made smaller, even when recording and erasing (initializing) are repeatedly carried out on the magnetic recording medium 2. Therefore, even when recording operations are repeatedly carried out on the magnetic recording medium 2 of this type, it is possible to obtain high resolution and a greater magnetic attracting force to magnetic toner.

Additionally, even in the case when the angle made by the directions of anisotropy of the first magnetic film 2a and the second magnetic film 2b is set at 90 degrees, the height of serration formed thereon slightly increases as illustrated in FIG. 17 until the recording operations have been repeated up to approximately ten times; this is supposedly because the direction of anisotropy of the first magnetic film 2a slightly rotates toward the direction of the external magnetic field. Moreover, it is considered that the reason that the height of serration does not change after the repeated recording operations exceeding 10 times is because the above-mentioned rotation is saturated to attain a stable state after the recording operations of approximately ten times.

EXAMPLE 3

In the present example, explanations will be given of the following relationships:

① the relationship between the thickness of the first magnetic film 2a in the magnetic recording medium 2 and the resolution of a magnetic latent image formed on the magnetic recording medium 2, ② the relationship between the thickness of the second magnetic film 2b in the magnetic recording medium 2 and the attracting property thereof for attracting magnetic toner to a magnetic latent image formed on the magnetic recording medium 2, and ③ the relationship between the ratio of the thickness of the first magnetic film 2a to the thickness of the second magnetic film 2b in the magnetic recording medium 2 and the resolution of a magnetic latent image formed on the magnetic recording medium 2.

First, with respect to ① the relationship between the thickness of the first magnetic film 2a in the magnetic recording medium 2 and the resolution of a magnetic latent image formed on the magnetic recording medium 2, an explanation will be given based upon measurements carried out on samples E and F.

Sample E has a construction in which the film thickness of the first magnetic film 2a is set at 0.11 $\mu$m in the construction of sample A. With respect to sample E, the following description will discuss the formation of the first magnetic film 2a, the second magnetic film 2b and the protective film 3. On a glass substrate 5, by using a composite target with a Co target carrying a Tb chip so as to attain a predetermined composition, the first magnetic film 2a, made of a TbCo amorphous alloy film with a thickness of 0.11 $\mu$m, was formed by a sputtering method while applying a magnetic field in the first in-plane direction.

Similarly, on the first magnetic film 2a, by using a composite target with a Co target carrying a Tb chip so as to attain a predetermined composition, the second magnetic film 2b, made of a TbCo amorphous alloy film with a thickness of 1.5 $\mu$m, was formed by a sputtering method while applying a magnetic field in the second in-plane direction different from the first direction.

Further, a TiN film with a thickness of 0.1 $\mu$m was formed on the second magnetic film 2b also by a sputtering method as the protective film 3.

In both of the first and second magnetic films 2a and 2b, the above-mentioned TbCo amorphous alloy films are set so as to have a Tb composition of 11.0 atom %. Here, in the same manner as sample A, sample E is arranged so that the first direction corresponding to the direction of in-plane magnetic anisotropy of the first magnetic film 2a and the second direction corresponding to the direction of in-plane magnetic anisotropy of the second magnetic film 2b make an angle of 90 degrees; that is, the directions are orthogonal to each other. Here, the sputtering processes were carried out by a high-frequency sputtering method in which no bias voltage is applied. Therefore, sample E has a construction in which the film thickness of the first magnetic film 2a is changed to 0.11 $\mu$m in the construction of sample A.

Figure 18:
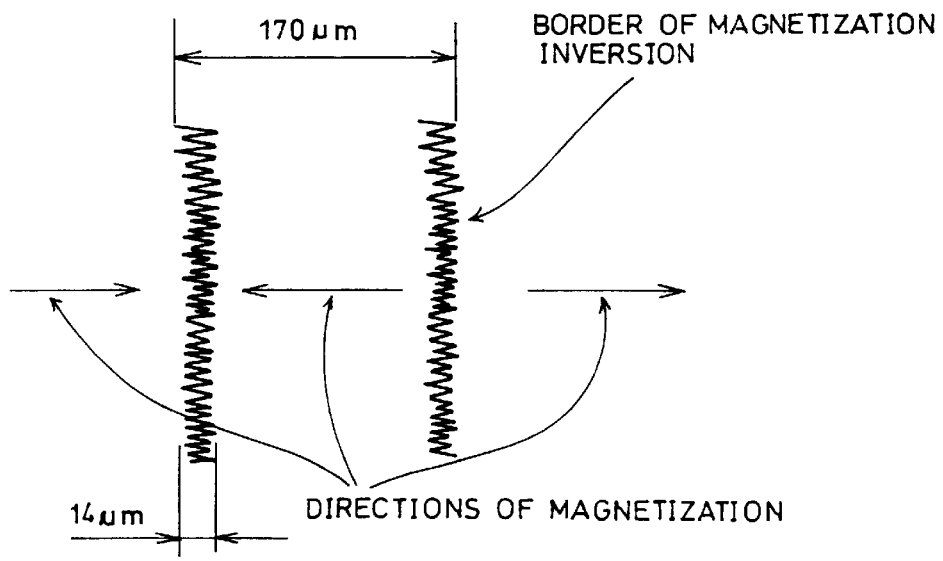
FIG. 18 is an explanatory drawing that schematically shows a magnetic latent image formed on a magnetic recording medium with respect to sample E in which the magnetic recording medium is provided in accordance with Embodiment 1.

FIG. 18 is an explanatory drawing that schematically shows the results of the following observation: After having applied an initializing magnetic field in the direction of magnetic anisotropy of the second magnetic film 2b in the magnetic recording medium 2 of sample E until it attained a saturated state, a magnetic latent image was formed thereon by the magnetic-latent-image recording device 40 shown in FIG. 4, and the magnetic latent image thus formed was observed by using a powder chart-forming method.

Here, the formation of the magnetic latent image onto sample A was carried out as follows: while the bias-magnetic-field applying device 42 was applying a bias magnetic field of 24000 A/m (300 Oe) in a direction reversed to the direction of the initializing magnetic field, the magnetic-latent-image recording device 40, shown in FIG. 4, allowed the magnetic recording medium 2 and the Ni thin-film 43 of the thermo-input device 41 to contact each other while a dc voltage of 15 V was applied to the Ni thin-film 43 for 20 msec.

As illustrated in FIG. 18, the width of a magnetic latent image formed on the magnetic recording medium 2 is 170 $\mu$m, which is wider than the width of the magnetic latent image formed on sample A under the same recording conditions; however, the height of serration is 14 $\mu$m, which is virtually the same as the height of serration of the magnetic latent image formed on sample A under the same recording conditions.

Furthermore, in order to carry out a higher-resolution recording operation using sample E, a recording test was conducted by changing the application of electric power to the Ni thin-film 43 to a dc voltage of 15 V for 7 msec so as to form a magnetic latent image, and a developing test was conducted on the magnetic latent image thus formed. As a result, magnetic toner adhered to sample E in a line shape with a width of 65 $\mu$m, making it possible to obtain a good visual image.

Figure 19:
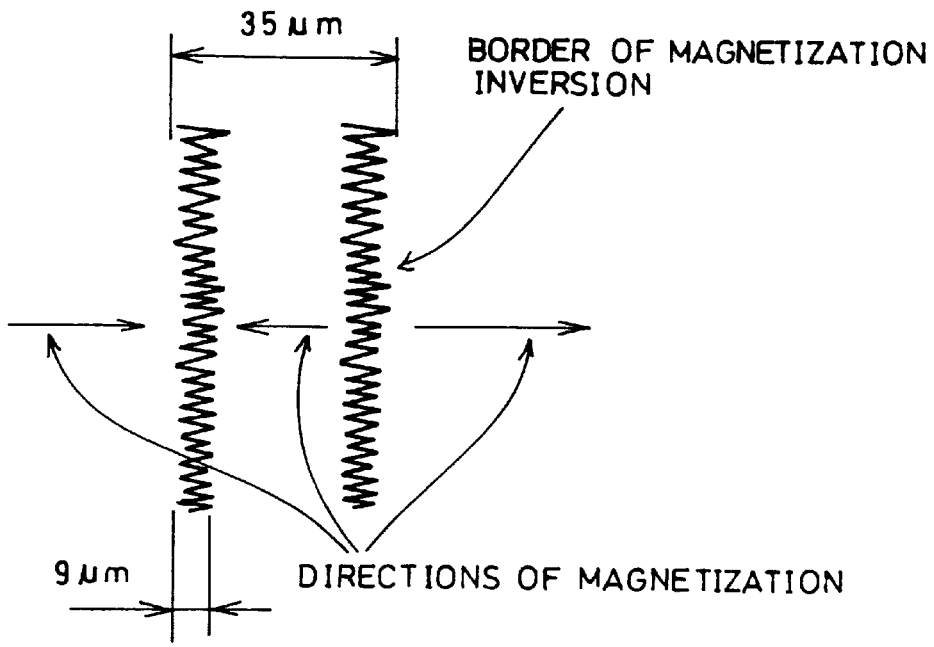
FIG. 19 is an explanatory drawing that schematically shows a magnetic latent image that has been formed in a shortened thermo-input time in the magnetic recording medium of sample E.

The magnetic latent image, formed on the magnetic recording medium 2 by the above-mentioned recording test, was observed by using a powder chart-forming method, and the result is schematically shown in FIG. 19. As illustrated in this Figure, the width of the magnetic latent image is 35 $\mu$m, which is wider than the width of the magnetic latent image formed on sample A under the same recording conditions, and the height of serration is 9 $\mu$m, which is virtually as high as the height of serration of the magnetic latent image formed on sample A under the same recording conditions.

Sample F serves as a comparative example. Sample F has a construction in which the film thickness of the first magnetic film 2a is changed to 0.08 μm in the construction of sample A. The following description will discuss the formation of the first magnetic film 2a, the second magnetic film 2b and the protective film 3.

On a glass substrate 5, by using a composite target with a Co target carrying a Tb chip so as to attain a predetermined composition, the first magnetic film 2a, made of a TbCo amorphous alloy film with a thickness of 0.08 μm, was formed by a sputtering method while applying a magnetic field in the first in-plane direction.

Similarly, on the first magnetic film 2a, by using a composite target with a Co target carrying a Tb chip so as to attain a predetermined composition, the second magnetic film 2b, made of a TbCo amorphous alloy film with a thickness of 1.5 μm, was formed by a sputtering method while applying a magnetic field in the second in-plane direction different from the first direction.

Further, the protective film 3 was formed on the second magnetic film 2b also by a sputtering method as a TiN film with a thickness of 0.1 μm.

In both of the first and second magnetic films 2a and 2b, the above-mentioned TbCo amorphous alloy films are set so as to have a Tb composition of 11 atom %. Here, in the same manner as samples A and E, sample F is arranged so that the first direction corresponding to the direction of in-plane magnetic anisotropy of the first magnetic film 2a and the second direction corresponding to the direction of in-plane magnetic anisotropy of the second magnetic film 2b make an angle of 90 degrees; that is, the directions are orthogonal to each other. The sputtering processes were carried out by a high-frequency sputtering method in which no bias voltage is applied. Therefore, sample F has a construction in which the film thickness of the first magnetic film 2a is changed to 0.08 μm in the construction of sample A.

Figure 20:
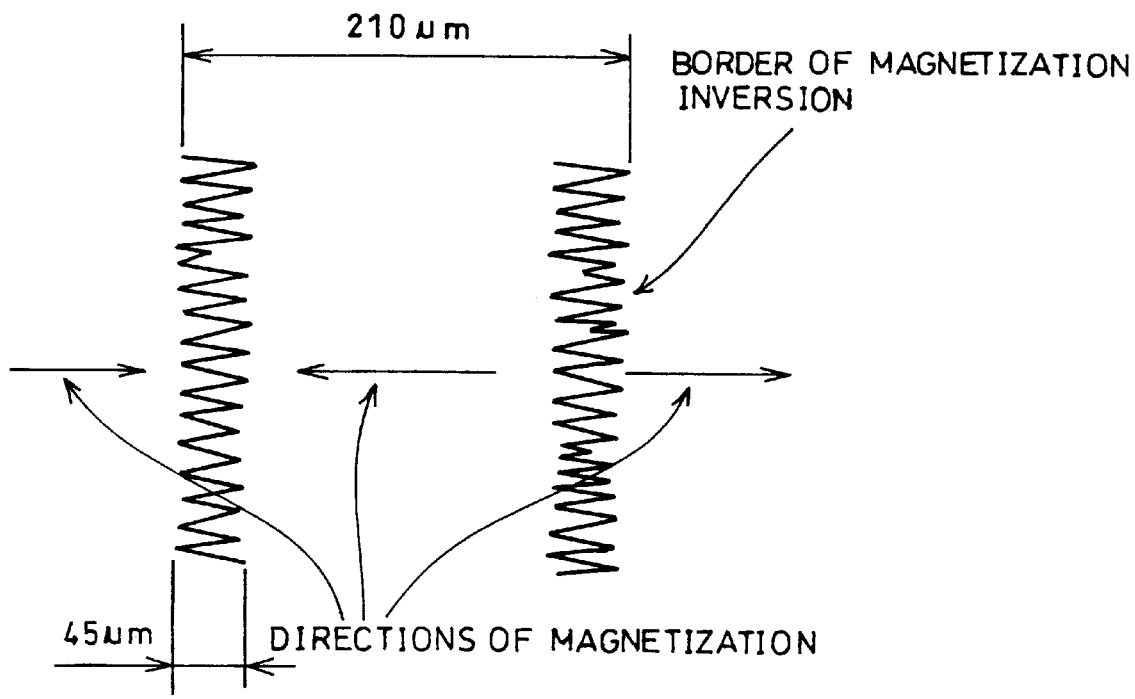
FIG. 20 is an explanatory drawing that shows a magnetic latent image formed on the magnetic recording medium of sample F that serves as another comparative example.

FIG. 20 is an explanatory drawing that schematically shows the results of the following observation: After having applied an initializing magnetic field in the direction of magnetic anisotropy of the second magnetic film 2b in the magnetic recording medium 2 of sample F until it attained a saturated state, a magnetic latent image was formed on the magnetic recording medium 2, and the magnetic latent image was observed by using a powder chart-forming method.

Here, the formation of the magnetic latent image was carried out as follows: while the bias-magnetic-field applying device 42 was applying a bias magnetic field of 24000 A/m (300 Oe) in a direction reversed to the direction of the initializing magnetic field, the magnetic-latent-image recording device 40, shown in FIG. 4, allowed the magnetic recording medium 2 and the Ni thin-film 43 of the thermo-input device 41 to contact each other while a dc voltage of 15 V was applied to the Ni thin-film 43 for 20 msec.

As illustrated in FIG. 20, the width of a magnetic latent image formed on the magnetic recording medium 2 is 210 μm, which is wider than the width of the magnetic latent image formed on sample A under the same recording conditions. Further, the height of serration is 45 μm, which is higher than the height of serration of the magnetic latent image formed on sample A under the same recording conditions.

Furthermore, in order to carry out a higher-resolution recording operation using sample F, a recording test was conducted by changing the application of electric power to the Ni thin-film 43 to a dc voltage of 15 V for 7 msec so as to form a magnetic latent image, and a developing test was conducted by scattering magnetic toner onto the magnetic latent image thus formed. The test results showed that the amount of magnetic toner adhered was quite insufficient.

Figure 21:
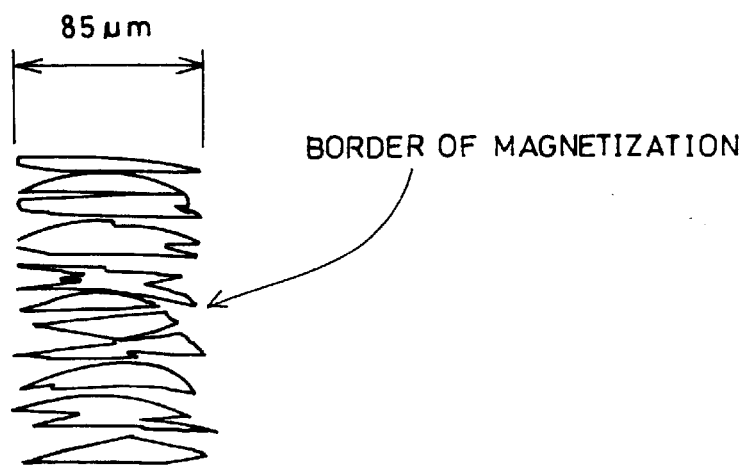
FIG. 21 is an explanatory drawing that schematically shows a magnetic latent image that has been formed in a shortened thermo-input time in the magnetic recording medium of sample F.

The magnetic latent image, formed on the magnetic recording medium 2 through the above-mentioned recording test, was observed by using a powder chart-forming method, and the results is schematically shown in FIG. 21. As illustrated in this Figure, although the width of the magnetic latent image is 85 μm, a continuous line-shaped border of magnetization inversion was not formed. This suggests that failure to properly form the continuous line-shaped border of magnetization inversion results in a reduction in the magnetic attracting force to magnetic toner.

As described above, in the magnetic recording medium 2, when the thickness of the first magnetic film 2a becomes smaller than 0.1 μm, it is not possible to increase the resolution of a magnetic latent image formed on the magnetic recording medium 2 that has the construction wherein the first magnetic film 2a and the second magnetic film 2b whose magnetic anisotropy is different from that of the first magnetic film 2a are stacked. When the thickness of the first magnetic film 2a is set greater than 0.1 μm, it becomes possible to increase the resolution of a magnetic latent image formed on the magnetic recording medium 2.

Next, with respect to ② the relationship between the thickness of the second magnetic film 2b in the magnetic recording medium 2 and the attracting property thereof for attracting magnetic toner to a magnetic latent image formed on the magnetic recording medium 2, an explanation will be given based upon measurements carried out on samples G and H.

Sample G has a construction in which the film thickness of the first magnetic film 2a is set at 0.3 μm and the film thickness of the second magnetic film 2b is set at 0.52 μm in the construction of sample A. With respect to sample G, the following description will discuss the formation of the first magnetic film 2a, the second magnetic film 2b and the protective film 3.

On a glass substrate 5, by using a composite target with a Co target carrying a Tb chip so as to attain a predetermined composition, the first magnetic film 2a, made of a TbCo amorphous alloy film with a thickness of 0.3 μm, was formed by a sputtering method while applying a magnetic field in the first in-plane direction.

Similarly, on the first magnetic film 2a, by using a composite target with a Co target carrying a Tb chip so as to attain a predetermined composition, the second magnetic film 2b, made of a TbCo amorphous alloy film with a thickness of 0.52 μm, was formed by a sputtering method while applying a magnetic field in the second in-plane direction different from the first direction.

Further, the protective film 3 was formed on the second magnetic film 2b also by a sputtering method as a TiN film with a thickness of 0.1 μm.

In both of the first and second magnetic films 2a and 2b, the above-mentioned TbCo amorphous alloy films are set so as to have a Tb composition of 11.0 atom %. Here, in the same manner as samples A, E and F, sample G is arranged so that the first direction corresponding to the direction of in-plane magnetic anisotropy of the first magnetic film 2a and the second direction corresponding to the direction of in-plane magnetic anisotropy of the second magnetic film 2b make an angle of 90 degrees; that is, the directions are orthogonal to each other. Here, the sputtering processes were carried out by a high-frequency sputtering method in which no bias voltage is applied. Therefore, sample G has a construction in which the film thickness of the first magnetic film 2a is changed to 0.3 μm and the film thickness of the second magnetic film 2b is changed to 0.52 μm in the construction of sample A.

After having applied an initializing magnetic field in a direction of magnetic anisotropy of the second magnetic film 2b to the magnetic recording medium 2 of sample G, a recording test was carried out so as to form a magnetic latent image on the magnetic recording medium 2, and then a developing test was carried out by scattering magnetic toner onto the magnetic latent image thus formed. As a result, adhesion of magnetic toner appeared in a line shape with a width of 210 μm, making it possible to obtain a good visual image.

Here, the formation of the magnetic latent image was carried out as follows: while the bias-magnetic-field applying device 42 was applying a bias magnetic field of 24000 A/m (300 Oe) in a direction reversed to the direction of the initializing magnetic field, the magnetic-latent-image recording device 40 allowed the magnetic recording medium 2 and the Ni thin-film 43 of the thermo-input device 41 to contact each other while a dc voltage of 15 V was applied to the Ni thin-film 43 for 20 msec.

Figure 22:
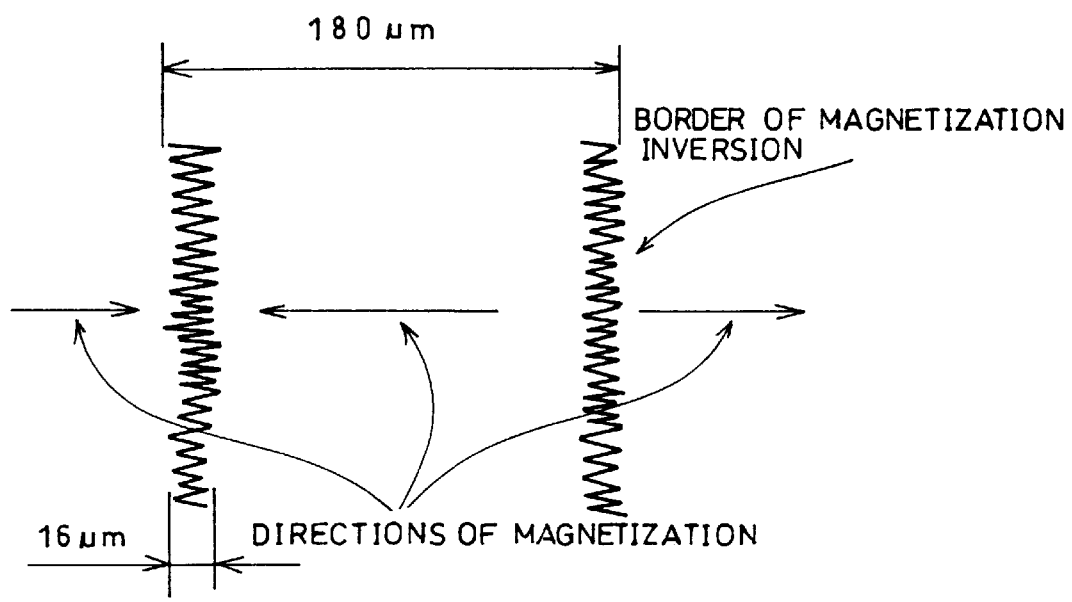
FIG. 22 is an explanatory drawing that schematically shows a magnetic latent image formed on a magnetic recording medium with respect to sample G in which the magnetic recording medium is provided in accordance with Embodiment 1.

In the above-mentioned recording test, the magnetic latent image, formed on the magnetic recording medium 2, was observed by using a powder chart-forming method, and the results are schematically shown in FIG. 22. As illustrated in FIG. 22, the width of the magnetic latent image is 180 μm, which is wider than the width of the magnetic latent image formed on sample A under the same recording conditions; however, the height of serration in the magnetic latent image is 16 μm, which is virtually the same as the height of serration in the magnetic latent image formed on sample A under the same recording conditions.

Sample H, on the other hand, has a construction in which the film thickness of the first magnetic film 2a is set at 0.3 μm and the film thickness of the second magnetic film 2b is set at 0.49 μm in the construction of sample A. With respect to sample H, the following description will discuss the formation of the first magnetic film 2a, the second magnetic film 2b and the protective film 3.

On a glass substrate 5, by using a composite target with a Co target carrying a Tb chip so as to attain a predetermined composition, the first magnetic film 2a, made of a TbCo amorphous alloy film with a thickness of 0.3 μm, was formed by a sputtering method while applying a magnetic field in the first in-plane direction.

Similarly, on the first magnetic film 2a, by using a composite target with a Co target carrying a Tb chip so as to attain a predetermined composition, the second magnetic film 2b, made of a TbCo amorphous alloy film with a thickness of 0.49 μm, was formed by a sputtering method while applying a magnetic field in the second in-plane direction different from the first direction.

Further, the protective film 3 was formed on the second magnetic film 2b also by a sputtering method as a TiN film with a thickness of 0.1 μm.

In both of the first and second magnetic films 2a and 2b, the above-mentioned TbCo amorphous alloy films are set so as to have a Tb composition of 11.0 atom %. Here, in the same manner as samples A, E, F, and G, sample H is arranged so that the first direction corresponding to the direction of in-plane magnetic anisotropy of the first magnetic film 2a and the second direction corresponding to the direction of in-plane magnetic anisotropy of the second magnetic film 2b make an angle of 90 degrees; that is, the directions are orthogonal to each other. Here, the sputtering processes were carried out by a high-frequency sputtering method in which no bias voltage is applied. Therefore, sample H has a construction in which the film thickness of the first magnetic film 2a is changed to 0.3 μm and the film thickness of the second magnetic film 2b is changed to 0.49 μm in the construction of sample A.

After having applied to sample H an initializing magnetic field in a direction of magnetic anisotropy of the second magnetic film 2b in the magnetic recording medium 2, a recording test was carried out so as to form a magnetic latent image, and then a developing test was carried out by scattering magnetic toner onto the magnetic latent image thus formed. As a result, the amount of magnetic-toner adhesion was insufficient.

Here, the formation of the magnetic latent image was carried out as follows: while the bias-magnetic-field applying device 42 was applying a bias magnetic field of 24000 A/m (300 Oe) in a direction reversed to the direction of the initializing magnetic field, the magnetic-latent-image recording device 40 allowed the magnetic recording medium 2 and the Ni thin-film 43 of the thermo-input device 41 to contact each other while a dc voltage of 15 V was applied to the Ni thin-film 43 for 20 msec.

When the thickness of the second magnetic film 2b in the magnetic recording medium 2 becomes smaller than 0.5 μm as in the case of sample H, even if a magnetic latent image is formed on the magnetic recording medium 2 having the construction wherein the first magnetic film 2a and the second magnetic film 2b having a different direction of magnetic anisotropy are stacked, it is not possible for the magnetic latent image formed on the second magnetic film 2b to exert a magnetic attracting force with a sufficient magnitude to magnetic toner since the thickness of the second magnetic film 2b is too small.

Next, an explanation will be given of ③ the relationship between the ratio of the thickness of the first magnetic film 2a to the thickness of the second magnetic film 2b in the magnetic recording medium 2 and the resolution of a magnetic latent image formed on the magnetic recording medium 2. Although, in the foregoing explanations, the thickness of the first magnetic film 2a is set thinner than that of the second magnetic film 2b, the following description will discuss cases in which the thickness of the first magnetic film 2a is set thicker than that of the second magnetic film 2b.

Sample I has a construction in which the film thickness of the first magnetic film 2a is set at 1.0 μm and the film thickness of the second magnetic film 2b is set at 0.9 μm in the construction of sample A. With respect to sample I, the following description will discuss the formation of the first magnetic film 2a, the second magnetic film 2b and the protective film 3.

On a glass substrate 5, by using a composite target with a Co target carrying a Tb chip so as to attain a predetermined composition, the first magnetic film 2a, made of a TbCo amorphous alloy film with a thickness of 1.0 μm, was formed by a sputtering method while applying a magnetic field in the first in-plane direction.

Similarly, on the first magnetic film 2a, by using a composite target with a Co target carrying a Tb chip so as to attain a predetermined composition, the second magnetic film 2b, made of a TbCo amorphous alloy film with a thickness of 0.9 μm, was formed by a sputtering method while applying a magnetic field in the second in-plane direction different from the first direction.

Further, the protective film 3 was formed on the second magnetic film 2b also by a sputtering method as a TiN film with a thickness of 0.1 μm.

In both of the first and second magnetic films 2a and 2b, the above-mentioned TbCo amorphous alloy films are set so as to have a Tb composition of 11 atom %. Here, in the same manner as samples A, E, F, G and H, sample I is arranged so that the first direction corresponding to the direction of in-plane magnetic anisotropy of the first magnetic film 2a and the second direction corresponding to the direction of in-plane magnetic anisotropy of the second magnetic film 2b make an angle of 90 degrees; that is, the directions are orthogonal to each other. Here, the sputtering processes were carried out by a high-frequency sputtering method in which no bias voltage is applied. Therefore, sample I has a construction in which the film thickness of the first magnetic film 2a is changed to 1.0 μm and the film thickness of the second magnetic film 2b is changed to 0.9 μm in the construction of sample A.

Figure 23:
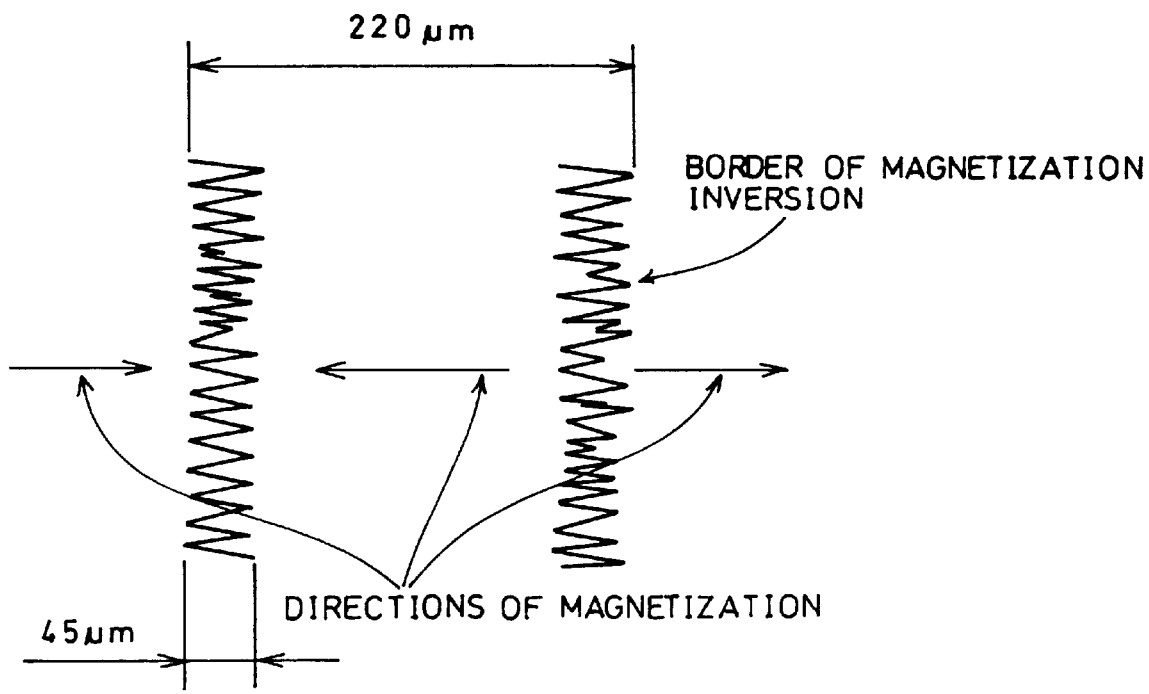
FIG. 23 is an explanatory drawing that schematically shows a magnetic latent image formed on a magnetic recording medium with respect to sample I in which the magnetic recording medium is provided in accordance with the present embodiment 1.

FIG. 23 is an explanatory drawing that schematically shows the result of an observation carried out as follows: After having applied an initializing magnetic field in a direction of magnetic anisotropy of the second magnetic film 2b to the magnetic recording medium 2 of sample I, a recording test was carried out so as to form a magnetic latent image on the magnetic recording medium 2, and then the magnetic latent image was observed by using a powder chart-forming method. Here, the formation of the magnetic latent image was carried out as follows: while the bias-magnetic-field applying device 42 was applying a bias magnetic field of 24000 A/m (300 Oe) in a direction reversed to the direction of the initializing magnetic field, the magnetic-latent-image recording device 40 allowed the magnetic recording medium 2 and the Ni thin-film 43 of the thermo-input device 41 to contact each other while a dc voltage of 15 V was applied to the Ni thin-film 43 for 20 msec.

As illustrated in FIG. 23, the width of the magnetic latent image formed on the magnetic recording medium 2 is 220 μm, which is wider than the width of the magnetic latent image formed on sample A under the same recording conditions. Further, the height of serration in the serrate magnetization transition structure appearing in the border of magnetization inversion is 45 μm, which is higher than the height of serration in the serrate magnetization transition structure appearing in the border of magnetization inversion of the magnetic latent image that was formed on sample A under the same recording conditions.

Furthermore, in order to carry out a higher-resolution recording operation using sample I, a recording test was conducted by changing the application of electric power to the Ni thin-film 43 to a dc voltage of 15 V for 7 msec so as to form a magnetic latent image, and a developing test was conducted by scattering magnetic toner onto the magnetic latent image thus formed. The test results showed that although the magnetic toner adhered thereto in a line shape with a width of 120 μm, the amount of the adhered magnetic toner was quite insufficient.

Figure 24:
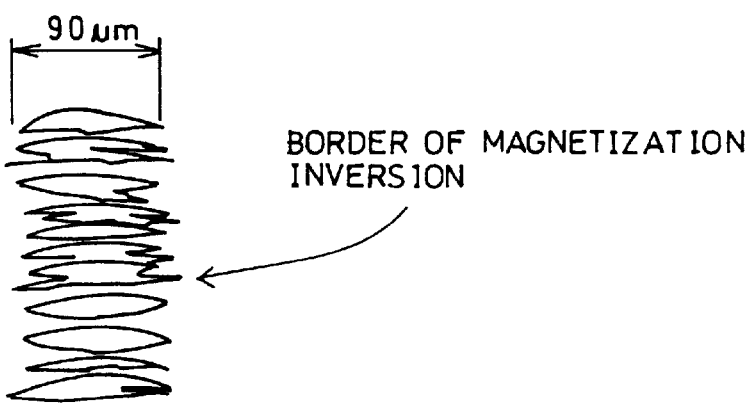
FIG. 24 is an explanatory drawing that schematically shows a magnetic latent image that has been formed in a shortened thermo-input time in the magnetic recording medium of sample I.

The magnetic latent image, formed on the magnetic recording medium 2 through the above-mentioned recording test, was observed by using a powder chart-forming method, and the results is schematically shown in FIG. 24. As illustrated in this Figure, although the width of the magnetic latent image is 90 μm, a continuous line-shaped border of magnetization inversion was not formed.

When the thickness of the second magnetic film 2b becomes thinner than that of the first magnetic film 2a in the magnetic recording medium 2 as in the case of sample I, it is not possible to increase the resolution of a magnetic latent image formed on the magnetic recording medium 2 that has the construction wherein the first magnetic film 2a and the second magnetic film 2b whose magnetic anisotropy is different from that of the first magnetic film 2a are stacked.

When the thickness of the first magnetic film 2a is set greater than 1.5 μm, it is necessary to make the thickness of the second magnetic film 2b thicker than that of the first magnetic film 2a in order to increase the resolution of a magnetic latent image formed on the magnetic recording medium; this makes the thickness of the magnetic recording medium corresponding to the total of these films thicker than 3.0 μm. Such a magnetic recording medium 2 having a total thickness of not less than 3.0 μm increases the manufacturing time, and also results in high production costs.

Further, when the thickness of the second magnetic film 2b is made thicker than 3.0 μm, the thickness of the magnetic recording medium 2 corresponding to the total of this film and the first magnetic film 2a has to be made not less than 3.1 μm. Such a second magnetic film 2b having a film thickness of not less than 3.0 μm increases the manufacturing time, and also results in high production costs.

As described above, in the magnetic recording medium 2 which is designed so that on the first magnetic film 2a having a magnetic anisotropy in the first in-plane direction, the second magnetic film 2b, which is an amorphous alloy film consisting of a rare-earth metal and a transition metal and which has a magnetic anisotropy in the second in-plane direction different from the first direction, is formed, when the thickness of the first magnetic film 2a is set in the range of 0.1 to 1.5 μm and the thickness of the second magnetic film 2b is set in the range of 0.5 to 3.0 μm with the second magnetic film 2b being thicker than the first magnetic film 2a, it is possible to form a magnetic latent image which has a reduced height of serration in a magnetic latent image. Thus, it becomes possible to increase the resolution of the magnetic latent image recording, and also to manufacture a magnetic recording medium 2 capable of forming a magnetic latent image with high resolution having a great magnetic attracting force to magnetic toner at low costs.

Consequently, the magnetic recording medium 2 of this type makes it possible to form a magnetic latent image with high resolution and also to attract magnetic toner in a stable manner; therefore, when the magnetic recording medium 2 of this type is applied to thermo-magnetic printers, it becomes possible to provide a thermo-magnetic printer capable of producing recorded images with high resolution and high contrast.

Additionally, in Examples 1 through 3, explanations are given only of the case in which the magnetic recording medium is constituted by two layers of magnetic films; however, the present invention is not intended to be limited thereby. For example, the magnetic recording medium may be constituted by eight layers of magnetic films, wherein the magnetic anisotropy of the lower three layers is set in the first in-plane direction so that these three laminated films function as the first magnetic film and wherein the magnetic anisotropy of the upper five layers is set in the second in-plane direction different from the first direction so that these five laminated films function as the second magnetic film. The application of such a construction of course makes it possible to obtain the aforementioned effects.

Moreover, the magnetic recording medium may be constituted by laminated films made of a plurality of in-plane magnetic films, wherein these magnetic films have magnetic anisotropies having respectively different directions in parallel with the film surface. In this case, it is necessary for the magnetic film forming the surface of the magnetic recording medium to be formed as an amorphous alloy film of a rare-earth metal and a transition metal. The application of such an arrangement also makes it possible to obtain the same effects as those of the aforementioned magnetic recording medium 2.

EMBODIMENT 2

The following description will discuss the second embodiment of the present invention. Here, in the present embodiment, those members that have the same functions and that are described in Embodiment 1 are indicated by the same reference numerals and the description thereof is omitted.

In the present embodiment, an explanation will be given of a manufacturing method of the aforementioned magnetic recording medium 2 (hereinafter, referred to as the present manufacturing method). The present manufacturing method, which is a method for forming the magnetic recording medium 2 that is designed in such a manner that on the first magnetic film 2a having a magnetic anisotropy in the first in-plane direction, the second magnetic film 2b, which is an amorphous alloy film consisting of a rare-earth metal and a transition metal and which has a magnetic anisotropy in the second in-plane direction different from the first direction, is formed, is provided with the steps of: forming the first magnetic film 2a while applying a magnetic field in the first in-plane direction, and then forming the second magnetic film 2b on the first magnetic film 2a while applying a magnetic field in the second in-plane direction in a stack manner.

Figure 25:
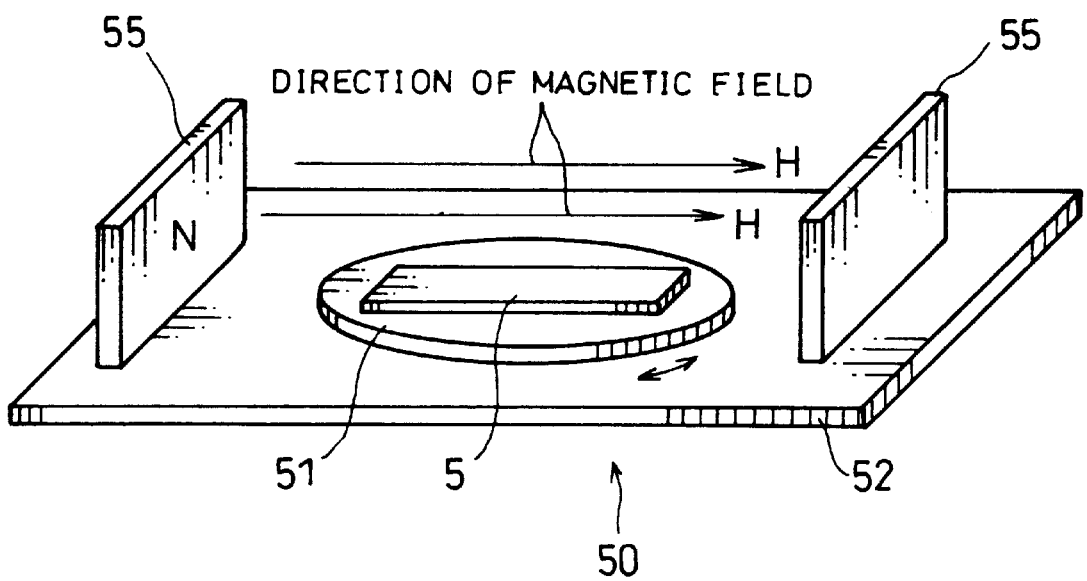
FIG. 25 is an explanatory drawing that shows a schematic construction of a holder that is used in a manufacturing method of a magnetic recording medium in accordance with Embodiment 2.

FIG. 25 is an explanatory drawing that shows a holder 50 used in the present manufacturing method. The holder 50 is provided with a first substrate holder 51 that is rotatable, a second substrate holder 52 that is not rotatable: and external-magnetic-field applying devices 55. A glass substrate 5 is placed on the first substrate holder 51. The external-magnetic-field applying devices 55, each constituted by a permanent magnet or an electromagnet, are secured to the second substrate holder 52 that is not rotatable, with their N pole and S pole aligned face to face in a manner so as to sandwich the glass substrate 5. The external-magnetic-field applying devices 55 are used for applying an external magnetic field with a desired intensity to the glass substrate 5 in a direction indicated by arrow H in FIG. 25. The direction of arrow H is parallel to the surface of the glass substrate 5.

By rotating the rotatable substrate holder 51, the holder 50 desirably changes the direction of the magnetic field that is applied in a direction parallel to the surface of the glass substrate 5, relative to the glass substrate 5.

Additionally, in order to change the direction of the external magnetic field that is applied to the glass substrate 5, the external-magnetic-field applying devices 55 may be rotated with the glass substrate 5 being secured, or both of the glass substrate 5 and the external-magnetic-field applying devices 55 may be rotated.

Here, if the permanent magnet is used to apply the external magnetic field, this eliminates the necessity of a power source for applying the external magnetic field, and consequently makes it possible to cut costs, and if the electro-magnet is used, this results in an advantage in that the intensity of the external magnetic field is desirably controlled. The following description will discuss the case in which permanent magnets are used as the external-magnetic-field applying devices 55. Additionally, with respect to the external magnetic field applied by the external-magnetic-field applying devices 55 in a direction parallel to the surface of the glass substrate 5, an external magnetic field of 16000 A/m (200 Oe) is a sufficient level; and in the present manufacturing method, an external magnetic field of 20000 A/m (250 Oe) was used.

Figure 26:
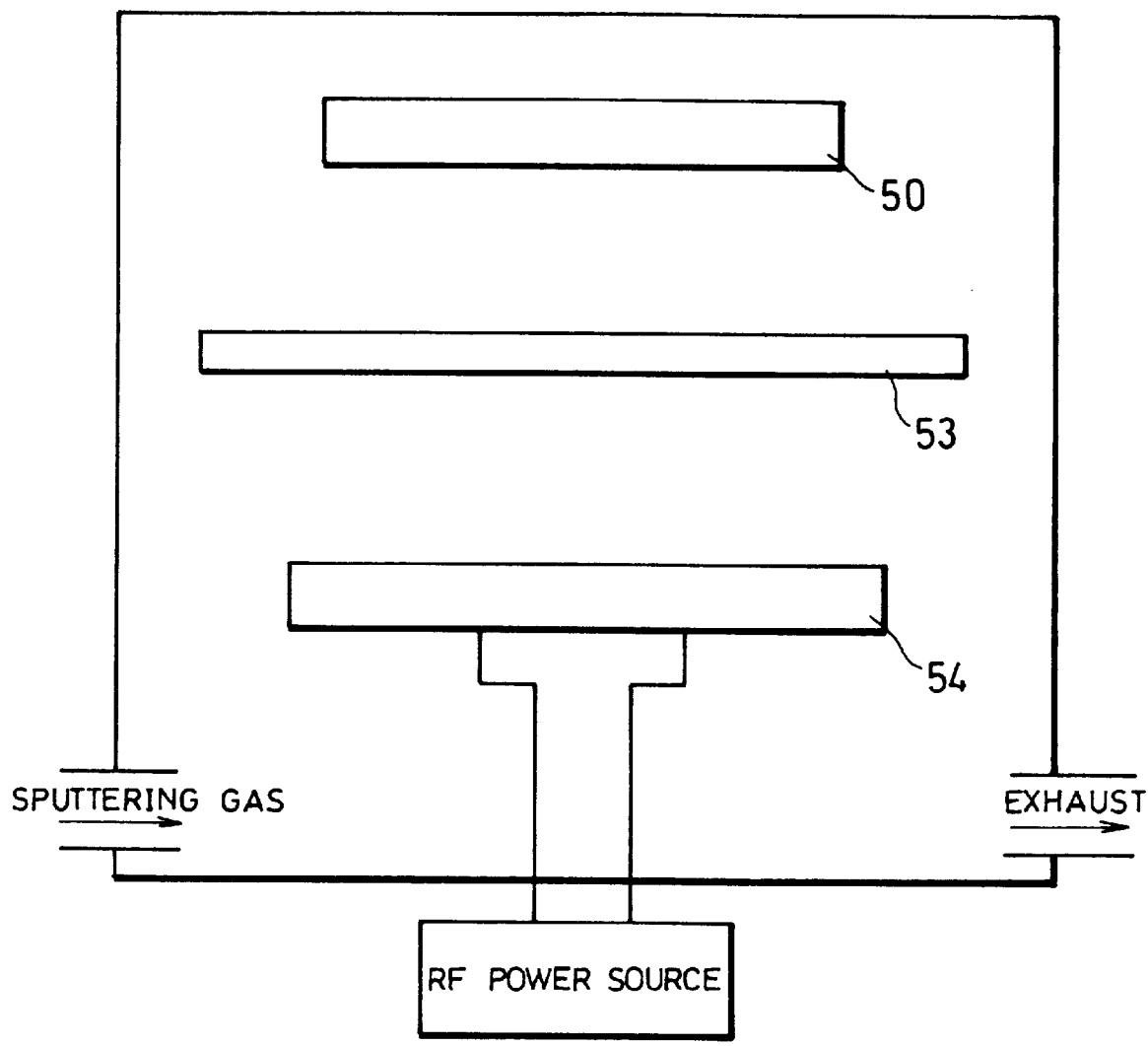
FIG. 26 is an explanatory drawing that shows a schematic construction of a sputtering device that is used in a manufacturing method of a magnetic recording medium in accordance with Embodiment 2.

FIG. 26 is an explanatory drawing that shows a schematic construction of a sputtering device used in the present manufacturing method. As illustrated in this Figure, this sputtering device is constituted by a shutter 53 and a composite target 54, and a holder 50 is set therein. The composite target 54 is a target for forming the first magnetic film 2a and the second magnetic film 2b. In the present manufacturing method, amorphous alloy films of TbCo are used as the first and second magnetic films 2a and 2b. Therefore, the composite target 54 is given as a Co target carrying a Tb chip thereon.

In the present manufacturing method, with respect to the film thicknesses of the first magnetic film 2a and the second magnetic film 2b that are manufactured by sputtering, the thickness of the first magnetic film 2a is set at 0.4 $\mu$m and the second magnetic film 2b is set at 1.5 $\mu$m. Further, a TiN film with a thickness of 0.1 $\mu$m is formed on the second magnetic film 2b by sputtering as the protective film 3. The above-mentioned TbCo films have a Tb composition of 11.0 atom %. With respect to the sputtering process, a high-frequency sputtering method in which no bias voltage is applied is used.

The following description will discuss the present manufacturing method in detail.

① The glass substrate 5 is placed on the substrate holder 51 of the holder 50. Further, in order to allow the external-magnetic-field applying devices 55, each made of a permanent magnet, to apply an external magnetic field in a direction parallel to the surface of the glass substrate 5, the first substrate holder 51 is disposed between the N pole and S pole of the external-magnetic-field applying devices 55. Then, the holder 50, arranged as described above, is set inside the chamber of the sputtering device.

② The chamber is evacuated until the pressure inside the chamber of the sputtering device has reached 0.001 Pa.

③ Argon gas, which serves as a sputtering gas, is introduced into the chamber so that the pressure inside the chamber has reached 1.07 Pa. Then, an electric discharge is started so that the composite target 54 is sputtered by argon ions, and a TbCo amorphous alloy film, which serves as a first magnetic film 2a, is formed on the glass substrate 5 with a desired thickness by opening the shutter 53.

④ Thereafter, the shutter 53, installed between the substrate holder 50 and the target, is closed, thereby stopping the formation of the first magnetic film 2a constituted by the TbCo amorphous alloy film onto the glass substrate 5.

Additionally, in the present manufacturing method, the formation of the first magnetic film 2a constituted by the TbCo amorphous alloy film is stopped by closing the shutter 53; however, the formation may be stopped by stopping the electric discharge or closing shutter while at the same time stopping the electric discharge.

⑤ Thereafter, the rotatable first substrate holder 51 is rotated by not less than 45 degrees. In the present manufacturing method, the first substrate holder 51 is rotated by 90 degrees.

⑥ Then, the shutter 53 is opened so that on the first magnetic film 2a formed on the glass substrate 5, a TbCo amorphous alloy film, which serves as a second magnetic film 2b, is formed with a desired thickness.

⑦ Thereafter, a TiN film, which serves as a protective film 3, is formed by a reactive sputtering method using a Ti target.

The magnetic recording medium 2 is manufactured by the processes ① through ⑦. In the present manufacturing method, upon forming the magnetic films 2a and 2b in the processes ③ and ⑥, the external-magnetic-field applying devices 55 apply a magnetic field in a direction parallel to the surface of the glass substrate 5. This makes it possible to impart to each of the magnetic films 2a and 2b a magnetic anisotropy having a direction in which the external magnetic field was applied upon forming each of the magnetic films 2a and 2b. Therefore, it become possible to easily control the directions of magnetic anisotropies of the first magnetic film 2a and the second magnetic film 2b.

Moreover, the magnetic anisotropies of the magnetic films 2a and 2b are imparted when the magnetic films are formed by sputtering; therefore, even in the case when the direction of magnetic anisotropy of the second magnetic film 2b is different from the direction of magnetic anisotropy of the first magnetic film 2a as in the above-mentioned case, the direction of magnetic anisotropy of the first magnetic film 2a is not changed by the external magnetic field that is applied upon formation of the second magnetic film 2b.

Furthermore, in the process ⑤, after the formation of the first magnetic film 2a, the rotatable first substrate holder 51 is rotated by an angle in the range from not less than 45 degrees to not more than 90 degrees prior to formation of the second magnetic film 2b. For this reason, it is possible to easily set the angle made by the direction of magnetic anisotropy of the first magnetic film 2a and the direction of magnetic anisotropy of the second magnetic film 2b at not less than 45 degrees.

The magnetic recording medium 2, manufactured as described above, has a construction wherein on the first magnetic film 2a having a magnetic anisotropy in the first in-plane direction, the second magnetic film 2b, which is an amorphous alloy film consisting of a rare-earth metal and a transition metal and which has a magnetic anisotropy in the second in-plane direction different from the first direction, is formed. Therefore, it is possible to form on the second magnetic film 2b a magnetic latent image which has a reduced height of serration in the serrate magnetization transition structure appearing in the border of magnetization inversion in a magnetic latent image. Consequently, it becomes possible to increase the resolution of the magnetic latent image formed on the magnetic recording medium 2, and also to increase the magnetic attracting force to magnetic toner. Thus, the magnetic recording medium 2 is preferably applied to a thermo-magnetic printer.

EMBODIMENT 3

The following description will discuss the third embodiment of the present invention. Here, in the present embodiment, those members that have the same functions and that are described in Embodiments 1 and 2 are indicated by the same reference numerals and the description thereof is omitted.

The manufacturing method (hereinafter, referred to as the present manufacturing method) for the magnetic recording medium 2 in accordance with the present embodiment is arranged so that in the manufacturing method for the magnetic recording medium 2 shown in FIG. 1, after formation of the first magnetic film 2a, the magnetic anisotropy of the first magnetic film 2a is allowed to have a magnetic anisotropy by carrying out an annealing treatment under a magnetic field, prior to formation of the second magnetic film 2b.

As described above, the magnetic recording medium 2 has a construction wherein on the first magnetic film 2a having a magnetic anisotropy in the first in-plane direction, the second magnetic film 2b, which is an amorphous alloy film consisting of a rare-earth metal and a transition metal and which has a magnetic anisotropy in the second in-plane direction different from the first direction, is formed. Further, the second magnetic film 2b is an in-plane magnetization film on which a magnetic latent image is formed by applying a magnetic field in a direction parallel to the surface thereof. In this case, the formation of the magnetic latent image is carried out by decreasing the coercive force by heating it at a predetermined temperature and applying an external magnetic field.

Figure 27:
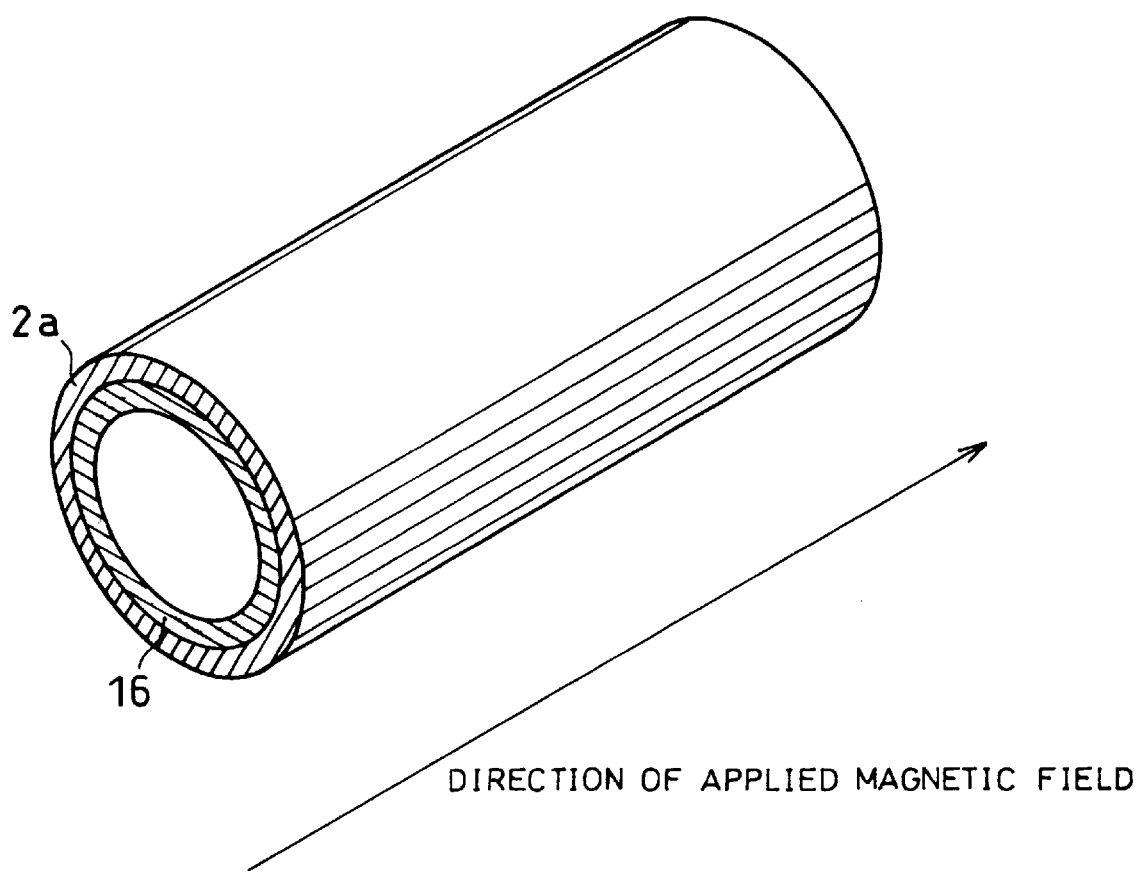
FIG. 27 is an explanatory drawing that indicates a manufacturing method of a magnetic recording medium in accordance with Embodiment 3.

FIG. 27 is an explanatory drawing that shows manufacturing processes for the magnetic recording medium 2 produced by the present manufacturing method. As illustrated in this Figure, in the present manufacturing method, a CoNi alloy film, which serves as a first magnetic film 2a, is formed by an electro-deposition method (electroplating) on an aluminum drum 16 with a thickness of 0.5 $\mu$m so as to attain predetermined composition.

Then, an annealing treatment is carried out on the aluminum drum 16 on which the CoNi alloy film was formed. The annealing treatment is carried out while applying a magnetic field in the length direction of the aluminum drum 16, that is, in a direction parallel to the surface of the CoNi alloy film. This direction is indicated by the arrow in FIG. 27. Thus, it is possible to impart a magnetic anisotropy in the direction of the applied magnetic field to the CoNi alloy film that serves as the first magnetic film 2a. This direction of the magnetic anisotropy is defined as the first direction.

Thereafter, on the first magnetic film 2a constituted by the CoNi alloy film formed on the aluminum drum 16, a TbCo amorphous alloy film is stacked by a sputtering method using a composite target with a Co target carrying a Tb chip so as to attain a predetermined composition, as the second magnetic film 2b having a magnetic anisotropy in a second in-plane direction. Further, TiN, which forms a protective film 3, is deposited with a thickness of 0.1 $\mu$m on the second magnetic film 2b by sputtering in the same manner.

In this case, the CoNi alloy film, which serves as the first magnetic film 2a, has a Ni composition of 40.0 atom %. Further, the TbCo amorphous alloy film, which serves as the second magnetic film 2b, has a Tb composition of 11.0 atom %. Here, the sputtering processes were carried out by a high-frequency sputtering method in which no bias voltage is applied.

The following description will discuss the present manufacturing method in detail.

① On the aluminum drum 16 that forms the magnetic recording medium 2, a CoNi alloy film, which serves as a first magnetic film 2a, is formed with a predetermined thickness by an electro-deposition method.

② The aluminum drum 16 on which the CoNi alloy film, serving as the first magnetic film 2a, was formed is placed into an annealing furnace with a vacuum exhauster, and after the furnace has been evacuated to approximately 0.001 Pa, an annealing treatment is carried out while applying a magnetic field in a direction indicated by the arrow in FIG. 27.

Here, with respect to the annealing temperature and the strength of the applied magnetic field, these factors may be set at any values as long as a magnetic anisotropy is imparted to the CoNi alloy film in an in-plane direction by applying the annealing treatment within the magnetic field. In the present manufacturing method, the annealing temperature was set at 500° C. and the intensity of the magnetic field was set at 32000 A/m (400 Oe).

Figure 28:
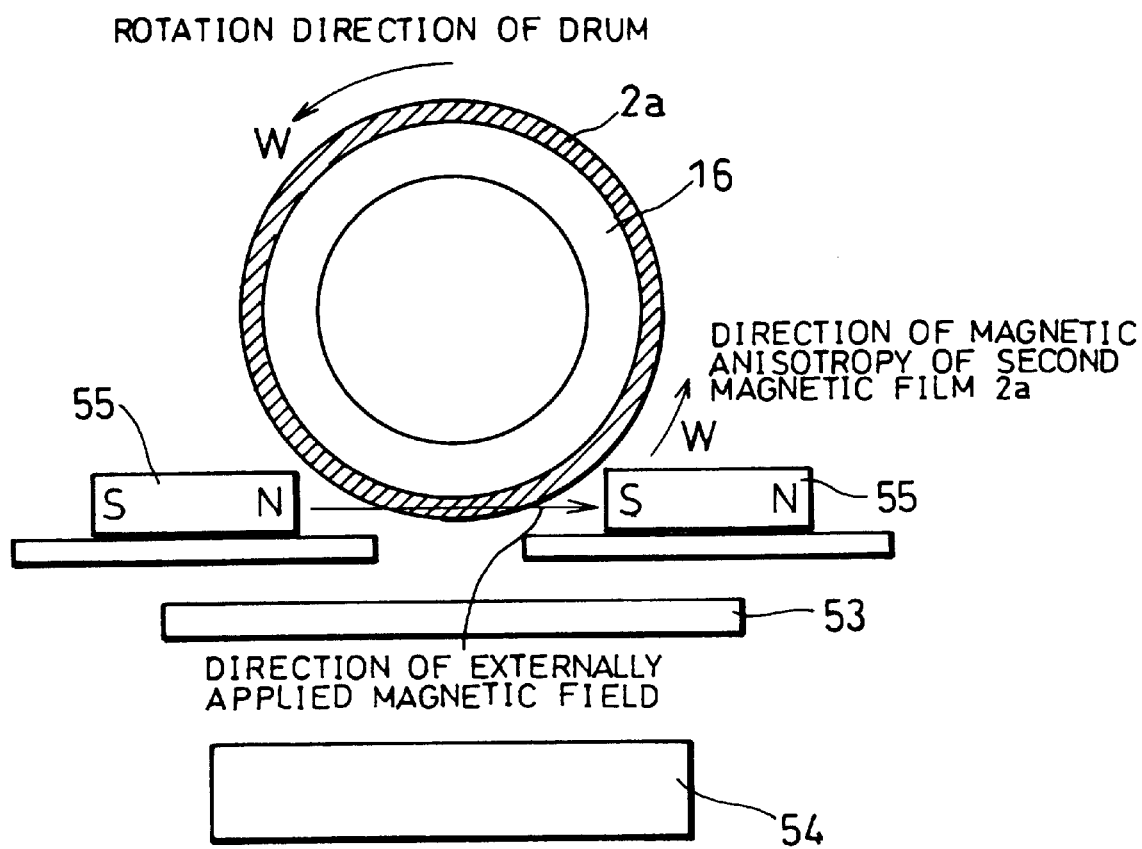
FIG. 28 is an explanatory drawing that shows a schematic construction of a sputtering device for forming a second magnetic film 2 that is used in a manufacturing method of a magnetic recording medium in accordance with Embodiment 3.
Figure 29A:
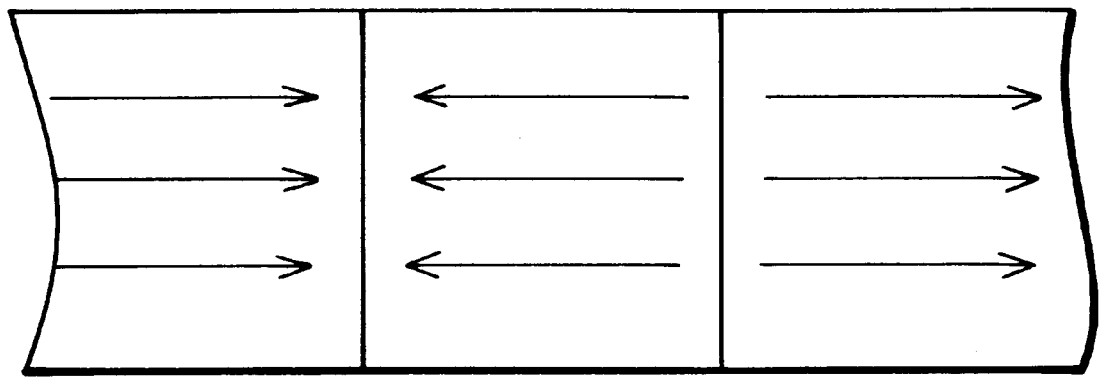
FIG. 29(a) is an explanatory drawing that shows an in-plane recording method.
Figure 29B:
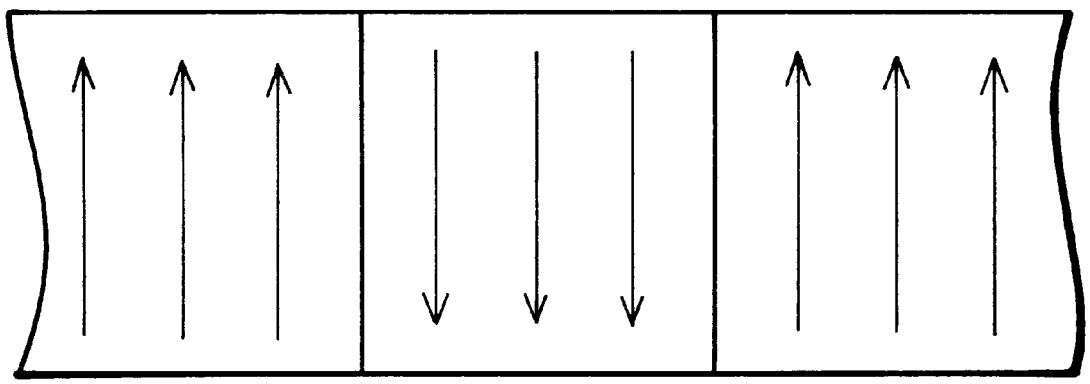
FIG. 29(b) is an explanatory drawing that shows a perpendicular recording method.

③ FIG. 28 is an explanatory drawing that schematically shows a sputtering device for forming the second magnetic film 2b. In this sputtering device, in the same manner as the sputtering device shown in FIG. 26, the external-magnetic-field applying devices 55, the shutter 53 and the composite target 54 are provided. The composite target 54 is constituted by a Co target carrying a Tb chip thereon. After the process ②, the aluminum drum 16, whereon the CoNi alloy film having an in-plane magnetic anisotropy was formed, is set inside the chamber of the sputtering device.

The external-magnet-field applying devices 55 are arranged so that upon forming the second magnetic film 2b on the aluminum drum 16, the second magnetic film 2b is formed while applying a magnetic field in a direction different from the direction of the magnetic anisotropy of the CoNi alloy film that serves as the first magnetic film 2a, and then they are set inside the chamber. With respect to each of the external-magnetic-field applying devices 55, a permanent magnet or an electro magnet may be adopted; and in the present manufacturing method, permanent magnets were used as the external-magnetic-field applying devices 55.

④ Thereafter, the chamber of the sputtering device is evacuated to a pressure of 0.001 Pa.

⑤ Argon gas, which serves as a sputtering gas, is introduced into the chamber so that the pressure inside the chamber has reached 1.07 Pa. Then, an electric discharge is started so that the composite target 54 is sputtered by argon ions, and a TbCo amorphous alloy film, which serves as a second magnetic film 2b, is thus formed with a desired thickness on the aluminum drum 16 whereon the CoNi alloy film that serves as the first magnetic film 2a was formed.

At this time, the formation of the TbCo amorphous alloy film is carried out while rotating the aluminum drum 16 in a direction indicated by the arrow W in FIG. 28; thus, the TbCo amorphous alloy film is formed with a uniform thickness and a magnetic anisotropy in the direction of W, that is, in the circumferential direction of the aluminum drum 16.

Moreover, prior to the formation of the TbCo amorphous alloy film, the surface of the CoNi alloy film may be sputtered by argon ions so as to clean the surface of the CoNi alloy film formed on the aluminum drum 16. This process is carried out in order to strengthen the magnetic coupling between the CoNi alloy film serving as the first magnetic film 2a and the TbCo amorphous alloy film serving as the second magnetic film 2b.

In the case when the surface of the first magnetic film 2a is not clean, if the magnetic recording medium 2 is manufactured by stacking the second magnetic film 2b onto the first magnetic film 2a, the magnetic coupling between the first and second magnetic films 2a and 2b becomes weaker. For this reason, even if a magnetic latent image is formed on the magnetic recording medium 2 manufactured as described above, no high-resolution recording is available. Therefore, in the case of formation of the first magnetic film 2a by an electro-deposition method or in the case of annealing treatment to the first magnetic film 2a under a magnetic field, it is preferable to carry out the sputtering process on the first magnetic film 2a prior to the lamination of the second magnetic film 2b.

⑥ Thereafter, a TiN film, which serves as a protective film 3, is formed on the second magnetic film 2b by a reactive sputtering method using a Ti target while rotating the aluminum drum 16.

The magnetic recording medium 2 is manufactured by the processes ① through ⑥. In the magnetic recording medium 2 manufactured as described above, a magnetic anisotropy is imparted to the first magnetic film 2a by carrying out the annealing treatment under a magnetic field during the process ②. For this reason, even in the case of a film manufactured by an electro-deposition method wherein it is difficult to impart an anisotropy upon manufacturing the first magnetic film 2a, it is possible to easily impart the magnetic anisotropy. Moreover, even in the case of the application of a base to which it is difficult to impart a magnetic anisotropy in a direction indicated by the arrow in FIG. 27 through a sputtering method as in the case of the application of an aluminum drum as a base, it becomes possible to easily impart the magnetic anisotropy to the first magnetic film 2a.

As described above, the magnetic recording medium 2, manufactured by the present manufacturing method, has a construction wherein on the first magnetic film 2a having a magnetic anisotropy in the first in-plane direction, the second magnetic film 2b, which is an amorphous alloy film consisting of a rare-earth metal and a transition metal and which has a magnetic anisotropy in the second in-plane direction different from the first direction, is formed. Therefore, it is possible to form on the second magnetic film 2b a magnetic latent image which has a reduced height of serration in the serrate magnetization transition structure appearing in the border of magnetization inversion in the magnetic latent image; thus, it becomes possible to increase the resolution of the magnetic latent image formed on the magnetic recording medium 2, and also to increase the magnetic attracting force to magnetic toner. Thus, the magnetic recording medium 2 is preferably applied to a thermomagnetic printer.

Additionally, in the present embodiment, the explanation was given by means of an example in which the CoNi alloy film is formed as the first magnetic film 2a by an electro-deposition method; however, the manufacturing method, which carries out an annealing treatment under a magnetic field as described in the present embodiment, may also be applied in a very effective manner to cases wherein an amorphous alloy film made of a rare-earth metal and a transition metal is used as the first magnetic film 2a through a sputtering method or an evaporation method. The reason for this is described as follows:

In the case when the aluminum drum 16, shown in FIG. 27, is used as the base, it is necessary to apply an external magnetic field in the length direction of the aluminum drum 16, in order to impart a magnetic anisotropy in the first direction by forming the first magnetic film 2a through a sputtering method or an evaporation method while applying an external magnetic field. However, as shown in FIG. 28, although it is relatively easy to from the second magnetic film 2b through a sputtering method or an evaporation method while applying a magnetic field in the circumferential direction of the aluminum drum 16, it is necessary to provide a large-size magnetic-field applying device and a large-size vacuum device in order to apply a magnetic field in the length direction of the aluminum drum 16, thereby necessitating a large-scale apparatus. As explained in the present embodiment, with the manufacturing method that imparts a magnetic anisotropy to the first magnetic film 2a by carrying out an annealing treatment under a magnetic field, it is possible to eliminate the necessity for the large-scale apparatus and also to manufacture the magnetic recording medium 2 at low costs.

As described above, the magnetic recording medium of the present invention is a magnetic recording medium whose magnetization direction is parallel to the surface thereof with its coercive force decreasing as temperature increases and on which, in a heated state, a magnetic latent image is formed by applying a bias magnetic field having a reverse direction to the magnetization direction in an initialized state. In the above-mentioned construction, the magnetic recording medium is provided with a plurality of magnetic films each of which has a magnetic anisotropy in a direction parallel to the surface, includes at least two magnetic films which have magnetic anisotropies parallel to the surface and different from each other, and also has an amorphous alloy film made of a rare-earth metal and a transition metal as an uppermost film.

In the magnetic recording medium of this type, the magnetic recording medium is constituted not only by a layer of an amorphous alloy film made of a rare-earth metal and a transition metal, but by a plurality of layers each of which has an in-plane magnetic anisotropy; therefore, it is possible to form on the second magnetic film a magnetic latent image which has a reduced height of serration in the serrate magnetization transition structure appearing in the border of magnetization inversion in the magnetic latent image. Consequently, it becomes possible to provide magnetic latent images with high resolution and high magnetic attracting force to magnetic toner.

Moreover, the magnetic recording medium of the present invention may be constituted by a first magnetic film having a magnetic anisotropy in a first direction parallel to the film surface and a second magnetic film that is formed on the first magnetic film and that is made of an amorphous alloy film of a rare-earth metal and a transition metal having a magnetic anisotropy in a second direction that is parallel to the film surface, and different from the first direction.

In the magnetic recording medium of this type, on the first magnetic film having a magnetic anisotropy in the first in-plane direction, the second magnetic film having a magnetic anisotropy in the second in-plane direction different from the first magnetic film is formed; therefore, it is possible to form on the second magnetic film a magnetic latent image which has a reduced height of serration in the serrate magnetization transition structure appearing in the border of magnetization inversion in the magnetic latent image. Consequently, it becomes possible to provide magnetic latent images with high resolution and high magnetic attracting force to magnetic toner.

Furthermore, in the above-mentioned recording magnetic medium, if the angle made by the direction of magnetic anisotropy of the first magnetic film and the direction of magnetic anisotropy of the second magnetic film is set in the range from not less than 45 degrees to not more than 90 degrees, it becomes possible to repeatedly form a magnetic latent image which has a reduced height of serration in the serrate magnetization transition structure appearing in the border of magnetization inversion in the magnetic latent image.

If, unlike the above-mentioned construction, the angle made by the direction of magnetic anisotropy of the first magnetic film and the direction of magnetic anisotropy of the second magnetic film is not set within the range from not less than 45° to not more than 90° (if the angle is less than 45 degrees), the angle made by the direction of the magnetic field externally applied upon recording a magnetic latent image and the direction of magnetic anisotropy of the first magnetic film becomes not more than 45 degrees. As a result, when a thermal-input operation is carried out under the application of the external magnetic field onto the magnetic recording medium, the direction of magnetic anisotropy of the first magnetic film is likely to rotate toward the external magnetic field due to the influence of the external magnetic field. In this manner, when recording operations using the thermal input are repeated under the application of the external magnetic field, the direction of magnetic anisotropy of the first magnetic film is likely to rotate in the direction of magnetic anisotropy of the second magnetic film, resulting in a greater height of serration in the serrate magnetization transition structure appearing in the border of magnetization inversion in the magnetic latent image formed on the second magnetic film.

In the present construction, the above-mentioned angle is set in the range of less than 45 degrees to not more than 90 degrees; therefore, even if recording operations are repeated, the angle made by the directions of magnetic anisotropies of the first recording medium and second recording medium is not changed so that it is possible to always form a magnetic latent image having a reduced height of serration in the serrate magnetization transition, thereby contributing to an image formation with high resolution.

Moreover, in the above-mentioned magnetic recording medium, if the film thickness of the second magnetic film is set not less than 0.1 $\mu$m, it becomes possible to sufficiently reduce the height of serration in the serrate magnetization transition structure appearing in the border of magnetization inversion in a magnetic latent image, and consequently to improve the resolution of the magnetic-latent-image recording.

Further, in the above-mentioned magnetic recording medium, if the film thickness of the second magnetic film is set not less than 0.5 $\mu$m, it is possible to increase the magnetic attracting force that is exerted by a magnetic latent image formed thereon toward magnetic toner.

Moreover, in the above-mentioned magnetic recording medium, in the case when the film thickness of the second magnetic film is set thicker than that of the first magnetic film, it is possible to form a magnetic latent image having a reduced height of serration in the serrate magnetization transition appearing in the border of magnetization inversion, and consequently to improve the resolution of the magnetic-latent-image recording.

Furthermore, the manufacturing method for the magnetic recording medium of the present invention is a manufacturing method for a magnetic recording medium whose magnetization direction is parallel to the surface thereof with its coercive force decreasing as temperature increases and on which, in a heated state, a magnetic latent image is formed by applying a bias magnetic field having a reverse direction to the magnetization direction in an initialized state. In the above-mentioned manufacturing method, the magnetic recording medium is provided with a plurality of magnetic films each of which has a magnetic anisotropy in a direction parallel to the surface, includes at least two magnetic films which have magnetic anisotropies parallel to the surface and different from each other, and also has an amorphous alloy film made of a rare-earth metal and a transition metal as an uppermost film. The above-mentioned manufacturing method also has the steps of forming the first magnetic film while applying a magnetic field in the first direction, and after this step, forming the second magnetic film while applying a magnetic field in the second direction.

With the above-mentioned manufacturing method, since the first magnetic film is formed while applying a magnetic field in the first in-plane direction, it is possible to easily impart a magnetic anisotropy in the first direction to the first magnetic film. Further, when the second magnetic film is formed on the first magnetic film in a stacked manner, the formation is carried out while applying a magnetic field in the second in-plane direction; therefore, it is possible to easily impart a magnetic anisotropy in the second direction to the second magnetic film. Further, with respect to each of the first and second magnetic films, the direction of its in-plane magnetic anisotropy can be controlled by the direction of a magnetic field that is to be applied upon formation of the film; therefore, the angle made by the direction of magnetic anisotropy of the first magnetic film and the direction of magnetic anisotropy of the second magnetic film can be controlled desirably.

Moreover, for each of the first and second magnetic films, its magnetic characteristic can be controlled by the intensity of the magnetic field to be applied upon formation; thus, it is possible to easily obtain a magnetic film having a desired magnetic characteristic.

Furthermore, the above-mentioned manufacturing method is also provided with steps of: after formation of the first magnetic film, aligning the magnetic anisotropy of the first magnetic film in the first direction through a heat treatment, and after this treatment, forming the second magnetic film while applying a magnetic field in the second direction.

With this manufacturing method, it is possible to impart a magnetic anisotropy to the first magnetic film after the first magnetic film has been formed; therefore, even in the case when it is difficult to apply a magnetic field upon formation of the first magnetic film, it is possible to easily impart a magnetic anisotropy to the first magnetic film.

Further, since the first magnetic film is annealed under a magnetic field, it becomes possible to control the magnetic characteristic of the first magnetic film by changing the intensity of the applied magnetic field and the annealing temperature, and consequently to easily obtain a magnetic film having a desired magnetic characteristic.

Moreover, in the case when the above-mentioned manufacturing method is added by another process which, after formation of the first magnetic film, cleans the surface of the first magnetic film by sputtering the first magnetic film prior to formation of the second magnetic film, the first magnetic film is sputtered after formation of the first magnetic film so that the surface of the first magnetic film is cleaned prior to formation of the second magnetic film; therefore, it becomes possible to provide a better magnetic coupling between the first magnetic film and the second magnetic film, and consequently to form on the second magnetic film a magnetic latent image which has a reduced height of serration in the serrate magnetization transition structure appearing in the border of magnetization inversion.

Moreover, in the magnetic photo-printing apparatus of the present invention which is a magnetic photo-printing apparatus having a magnetic-latent-image-bearing body provided with a base on which a magnetic recording medium for recording a magnetic latent image is formed, the magnetic recording medium is constituted by a plurality of magnetic films, each having a magnetic anisotropy in a direction parallel to the surface, and an amorphous alloy film of a rare-earth metal and a transition metal is provided as the uppermost layer.

With the above-mentioned magnetic photo-printing apparatus, a magnetic latent image, formed on the magnetic recording medium, is allowed to have a reduced height of serration in the serrate magnetization transition structure appearing in the border of magnetization inversion; therefore, it is possible to increase the resolution of the magnetic latent image recording. Consequently, it becomes possible to obtain an image with high contrast and high resolution by developing the magnetic latent image formed on the magnetic recording medium.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium, comprising:

a laminated film comprising two or more layers of magnetic films, wherein the magnetic film that forms an upper-most film in the laminated film is an amorphous alloy film of a rare-earth metal and a transition metal, and acts as a recording film such that a coercive force thereof decreases as temperature increases and a magnetic latent image is formed thereon by applying, in a heated states, a bias magnetic field having a reverse direction to the magnetization direction in an initialized state, and the layers of magnetic films in the laminated film have magnetic anisotropies of mutually different directions but all parallel to surfaces thereof.

2. The magnetic recording medium as defined in claim 1, wherein: the laminated film is constituted by a first layer of magnetic film having a magnetic anisotropy in a first direction parallel to the film surface and a second layer of magnetic film having a magnetic anisotropy in a second direction that is parallel to the film surface, and different from the first direction, the second layer of magnetic film forming the uppermost film of the laminated film.

3. The magnetic recording medium as defined in claim 2, wherein the first layer of magnetic film and/or the second layer of magnetic film two or more magnetic films mutually having magnetic anisotropies in the same direction.

4. The magnetic recording medium as defined in claim 2, wherein an angle between the first direction and the second direction is in the range from not less than 45 degrees to not more than 90 degrees.

5. The magnetic recording medium as defined in claim 2, wherein the film thickness of the second magnetic film is thicker than that of the first magnetic film.

6. The magnetic recording medium as defined in claim 5, wherein the film thickness of the first magnetic film is set not less than 0.1 $\mu$m.

7. The magnetic recording medium as defined in claim 6, wherein the film thickness of the first magnetic film is set not more than 1.5 $\mu$m.

8. The magnetic recording medium as defined in claim 7, wherein the film thickness of the second magnetic film is set not less than 0.5 $\mu$m.

9. The magnetic recording medium as defined in claim 8, wherein the film thickness of the second magnetic film is set not more than 3.0 $\mu$m.

10. The magnetic recording medium as defined in claim 5, wherein the sum of the film thickness of the first magnetic film and the film thickness of the second magnetic film is set not more than 3.0 μm.

11. The magnetic recording medium as defined in claim 2, wherein the second magnetic film is made of an amorphous alloy selected from the group consisting of TbCo, DyCo, GdCo, TbFeCo, DyFeCo and GdFeCo.

12. The magnetic recording medium as defined in claim 11, wherein the first magnetic film is made of a material selected from the group consisting of TbCo amorphous alloy, DyCo amorphous alloy, GdCo amorphous alloy, TbFeCo amorphous alloy, DyFeCo amorphous alloy, GdFeCo amorphous alloy, Co, CoNi alloy, CoNiP alloy, NiFe alloy, $MnO.Fe_2O_3$, $FeO.Fe_2O_3$, $CoO.Fe_2O_3$, $NiO.Fe_2O_3$, $CuO.Fe_2O_3$, $ZnO.Fe_2O_3$, and $MgO.Fe_2O_3$.

13. The magnetic recording medium as defined in claim 2, further comprising a protective film for protecting the first and second magnetic films, wherein the first magnetic film, the second magnetic film and the protective film are stacked on a substrate in this order.

14. The magnetic recording medium as defined in claim 2, wherein each of the first and second magnetic films is made of a TbCo amorphous alloy having a Tb composition of 10 to 12 atom %.

15. The magnetic recording medium as defined in claim 2, wherein the second magnetic film has a coercive force of not less than 24000 A/m (300 Oe) and a residual magnetization of not less than $150 \times 10^3$ A/m (150 emu/cc) at room temperature.

16. A manufacturing method of a magnetic recording medium that is constituted by a first magnetic film and a second magnetic film formed on the first magnetic film, the first magnetic film having a magnetic anisotropy in a first direction parallel to a surface thereof, and the second magnetic film being made of an amorphous alloy film of a rare-earth metal and a transition metal having a magnetic anisotropy in a second direction that is parallel to a surface thereof and different from the first direction, and acting as a recording film such that a coercive force thereof decreases as temperature increases and a magnetic latent image is formed thereon by applying, in a heated state, a bias magnetic field having a reverse direction to the magnetization direction in an intialized state, said manufacturing method comprising the steps of:

forming the first magnetic film having a magnetic anisotropy in the first direction parallel to the surface thereof, and forming the second magnetic film on the first magnetic film while applying a magnetic field in the second direction.

17. The manufacturing method of a magnetic recording medium as defined in claim 16, wherein the first magnetic film is formed while applying a magnetic field in the first direction.

18. The manufacturing method of a magnetic recording medium as defined in claim 16, further comprising the step of carrying out a heat treatment while applying an external magnetic field in the first direction, after formation of the first magnetic film.

19. The manufacturing method of a magnetic recording medium as defined in claim 16, further comprising the step of, after formation of the first magnetic film, sputtering a surface of the first magnetic film so as to clean the surface prior to formation of the second magnetic film.

20. A magnetic photo-printing apparatus comprising:

a magnetic-latent-image-bearing body having base supporting a magnetic recording medium that is constituted by a first magnetic film and a second magnetic film formed on the first magnetic film, the first magnetic film having a magnetic anisotropy in a first direction parallel to a surface thereof, and the second magnetic film being made of an amorphous alloy film of a rare-earth metal and a transition metal having a magnetic anisotropy in a second direction that is parallel to a surface thereof and different from the first direction, and acting as a recording film such that a coercive force thereof decreases as temperature increases and a magnetic latent image is formed thereon by applying, in a heated state, a bias magnetic field having a reverse direction to the magnetization direction in an intialized state, an initializing-magnetic-field generation means for aligning the magnetization direction of the second magnetic film of the recording medium in the second direction so as to form an initialized state;

a bias-magnetic-field applying means for applying a bias magnetic field having a magnetization direction reverse to that of the initialized state to the second magnetic film upon recording the magnetic latent image; and a thermal input means for heating the second magnetic film to a predetermined temperature.

21. The magnetic recording medium according to claim 1, wherein a magnitude of the coercive force and a residual magnetization of the first and second layers of magnetic film at room temperature are not less than 24000 A/m and not less than $150 \times 10^3$, respectively.

22. The magnetic recording medium according to claim 1, wherein a thickness of the first layer of magnetic film is less than a thickness of the second layer of magnetic film.

23. A method for forming an image, said method comprising:

providing a magnetic recording medium comprising a laminated film comprising two or more layers of magnetic films, wherein the magnetic film that forms an uppermost film in the laminated film is an amorphous alloy film of a rare-earth metal and a transition metal, and acts as a recording film such that a coercive force thereof decreases as temperature increases and a magnetic latent image is formed thereon by applying, in a heated states, a bias magnetic field having a reverse direction to the magnetization direction in an initialized state, and the layers of magnetic films in the laminated film have magnetic anisotropies of mutually different directions but all parallel to surfaces thereof;

initializing the magnetization state of the second layer of magnetic film by aligning the magnetization direction thereof in the second direction;

applying a thermal input to heat the second layer of magnetic film to a predetermined temperature, and applying a bias magnetic field having a direction reversed to the second direction in accord with signals corresponding to an image being formed, thus forming a latent magnetic image on the second layer of magnetic film; and developing the magnetic latent image with a magnetic toner.

24. The method according to claim 23, further comprising transferring the toner in imagewise fashion to a recording paper.

* * * * *